US011010605B2

(12) United States Patent
Nord et al.

(10) Patent No.: US 11,010,605 B2
(45) Date of Patent: May 18, 2021

(54) MULTI-MODEL DETECTION OF OBJECTS

(71) Applicant: Rapiscan Laboratories, Inc., Fremont, CA (US)

(72) Inventors: Claire Nord, Troy, MI (US); Simanta Gautam, Palo Alto, CA (US); Bruno Brasil Ferrari Faviero, Coconut Creek, FL (US); Steven Posun Yang, Palo Alto, CA (US); Jay Harshadbhai Patel, Sunnyvale, CA (US); Ian Cinnamon, Sherman Oaks, CA (US)

(73) Assignee: Rapiscan Laboratories, Inc., Fremont, CA (US)

( * ) Notice: Subject to any disclaimer, the term of this patent is extended or adjusted under 35 U.S.C. 154(b) by 117 days.

(21) Appl. No.: 16/526,744

(22) Filed: Jul. 30, 2019

(65) Prior Publication Data

US 2021/0034865 A1 Feb. 4, 2021

(51) Int. Cl.
*G06K 9/00* (2006.01)
*G06K 9/62* (2006.01)

(52) U.S. Cl.
CPC ......... *G06K 9/00624* (2013.01); *G06K 9/627* (2013.01); *G06K 9/6227* (2013.01); *G06K 9/6256* (2013.01)

(58) Field of Classification Search
CPC .. G06K 9/00624; G06K 9/627; G06K 9/6256; G06K 9/6227
USPC ........................................................ 382/103
See application file for complete search history.

(56) References Cited

U.S. PATENT DOCUMENTS

| 5,600,303 | A  | 2/1997  | Husseiny et al. |
| 6,128,365 | A  | 10/2000 | Bechwati et al. |
| H2110     | H  | 10/2004 | Newman et al. |
| 6,825,854 | B1 | 11/2004 | Beneke et al. |
| 7,277,577 | B2 | 10/2007 | Ying et al. |
| 7,702,068 | B2 | 4/2010  | Scheinman |
| 8,009,864 | B2 | 8/2011  | Linaker et al. |
| 8,014,493 | B2 | 9/2011  | Roux et al. |
| 8,494,210 | B2 | 7/2013  | Gudmundson et al. |
| 8,633,823 | B2 | 1/2014  | Armistead, Jr. et al. |
| 8,693,731 | B2 | 4/2014  | Holz et al. |
| 8,875,226 | B1 | 10/2014 | Marek |

(Continued)

FOREIGN PATENT DOCUMENTS

| CA | 2651131 A1 | 11/2007 |
| CA | 2796809 A1 | 10/2011 |

(Continued)

OTHER PUBLICATIONS

He et al. "Mask R-CNN," Facebook AI Research (FAIR) Apr. 5, 2017, 10 pages.

(Continued)

*Primary Examiner* — Ayodeji O Ayotunde
(74) *Attorney, Agent, or Firm* — Novel IP

(57) ABSTRACT

Disclosed is an object-detection system configured to utilize multiple object-detection models that generate respective sets of object-detection conclusions to detect objects of interest within images of scenes. The object-detection system is configured to implement a series of functions to reconcile any discrepancies that exist in its multiple sets of object-detection conclusions in order to generate one set of conclusions for each perceived object of interest within a given image.

20 Claims, 12 Drawing Sheets

(56) References Cited

U.S. PATENT DOCUMENTS

| | | | |
|---|---|---|---|
| 9,042,511 | B2 | 5/2015 | Peschmann |
| 9,042,661 | B2 | 5/2015 | Pavlovich et al. |
| 9,170,212 | B2 | 10/2015 | Bouchard et al. |
| 2002/0159627 | A1 | 10/2002 | Schneiderman et al. |
| 2002/0186862 | A1 | 12/2002 | McClelland et al. |
| 2004/0066966 | A1 | 4/2004 | Schneiderman |
| 2005/0117700 | A1 | 6/2005 | Peschmann et al. |
| 2006/0088207 | A1 | 4/2006 | Schneiderman |
| 2006/0197523 | A1 | 9/2006 | Palecki et al. |
| 2007/0112556 | A1 | 5/2007 | Lavi et al. |
| 2008/0008353 | A1 | 1/2008 | Park et al. |
| 2008/0063140 | A1 | 3/2008 | Awad |
| 2008/0170660 | A1 | 7/2008 | Gudmundson |
| 2008/0283761 | A1 | 11/2008 | Robinson |
| 2010/0046704 | A1 | 2/2010 | Song et al. |
| 2012/0293633 | A1 | 11/2012 | Yamato |
| 2012/0304085 | A1 | 11/2012 | Kim et al. |
| 2013/0163811 | A1 | 6/2013 | Oelke |
| 2013/0215264 | A1 | 8/2013 | Soatto et al. |
| 2013/0294574 | A1 | 11/2013 | Peschmann |
| 2013/0322742 | A1 | 12/2013 | Walton et al. |
| 2014/0119604 | A1* | 5/2014 | Mai ................. G06K 9/00624 382/103 |
| 2014/0344533 | A1 | 11/2014 | Liu et al. |
| 2016/0098620 | A1 | 4/2016 | Geile |
| 2016/0117898 | A1 | 4/2016 | Kuznetsov et al. |
| 2016/0216398 | A1 | 7/2016 | Bendahan et al. |
| 2016/0232689 | A1 | 8/2016 | Morton |
| 2017/0061625 | A1 | 3/2017 | Estrada et al. |
| 2017/0083792 | A1 | 3/2017 | Rodriguez-Serrano et al. |
| 2017/0116511 | A1 | 4/2017 | Kim et al. |
| 2017/0263019 | A1 | 9/2017 | Song et al. |
| 2017/0278300 | A1 | 9/2017 | Hurter |
| 2017/0316285 | A1 | 11/2017 | Ahmed et al. |
| 2017/0350834 | A1 | 12/2017 | Prado |
| 2018/0089816 | A1 | 3/2018 | Potter et al. |
| 2018/0150713 | A1 | 5/2018 | Farooqi |
| 2018/0351634 | A1 | 12/2018 | Ryan et al. |
| 2021/0004589 | A1* | 1/2021 | Turkelson ................. G06K 9/66 |

FOREIGN PATENT DOCUMENTS

| | | |
|---|---|---|
| JP | 103997 | 11/1992 |
| JP | 2010520542 A | 6/2010 |
| JP | 2017062781 A | 3/2017 |
| WO | 2006119603 A1 | 11/2006 |
| WO | 2008107112 A2 | 9/2008 |
| WO | 2010050952 A1 | 5/2010 |

OTHER PUBLICATIONS

He et al. "Deep Residual Learning for Image Recognition," Microsoft Research Dec. 10, 2015, 12 pages.

Steitz et al. "Multi-view X-ray R-CNN," Department of Computer Science, TU Darmstadt, Darmstadt, Germany, Oct. 4, 2018, 16 pages.

Girshick et al. "Rich feature hierarchies for accurate object detection and semantic segmentation," Tech report (v5), UC Berkeley, Oct. 22, 2014, 21 pages.

Girschick, Ross "Fast R-CNN," Microsoft Research, Sep. 27, 2015, 9 pages.

Krizhevsky et al. "ImageNet Classification with Deep Convolutional Neural Networks," 9 pages.

Liu et al. "SSD: Single Shot MultiBox Detector," Dec. 29, 2016, 17 pages.

Lin et al. "Focal Loss for Dense Object Detection," Facebook AI Research (FAIR), Feb. 7, 2018, 10 pages.

Lin et al. "Microsoft COCO: Common Objects in Context," Feb. 21, 2015, 15 pages.

Lin et al. "Feature Pyramid Networks for Object Detection," Facebook AI Research (FAIR), Cornell University and Cornell Tech, Apr. 19, 2017, 10 pages.

Lin et al. "Cross-View Image Geolocalization," University of California, Brown University, 8 pages.

Redmon et al. "You Only Look Once: Unified, Real-Time Object Detection," 10 pages.

Ren et al. "Faster R-CNN: Towards Real-Time Object Detection with Region Proposal Networks," Jan. 6, 2016, 14 pages.

Simonyan et al. "Very Deep Convolutional Networks for Large-Scale Image Recognition," Visual Geometry Group, Department of Engineering Science, University of Oxford, Apr. 10, 2015, 14 pages.

Shaoqing, et al., "Faster R-CNN: Towards Real-Time Object Detection with Region Proposal Networks," IEEE Transactions on Pattern Analysis and Machine Intelligence, vol. 39, No. 6, Jun. 1, 2017, pp. 1137-1149.

Akcay, et al., "Transfer Learning Using Convolutional Neural Networks for Object Classification Within X-Ray Baggage Security Imagery," IEE International Conference on Image Processing (ICIP), Sep. 25, 2016, pp. 1057-1061.

European Patent Office, European Extended Search Report dated Nov. 27, 2018, issued in connection with European Patent Application No. 18183573.7, 11 pages.

Salvador et al. ("Faster R-CNN Features for Instance Search," IEEE Conference on Computer Vision and Pattern Recognition Workshops (CVPRW), Jun. 26-Jul. 1, 2016) (Year: 2016).

* cited by examiner

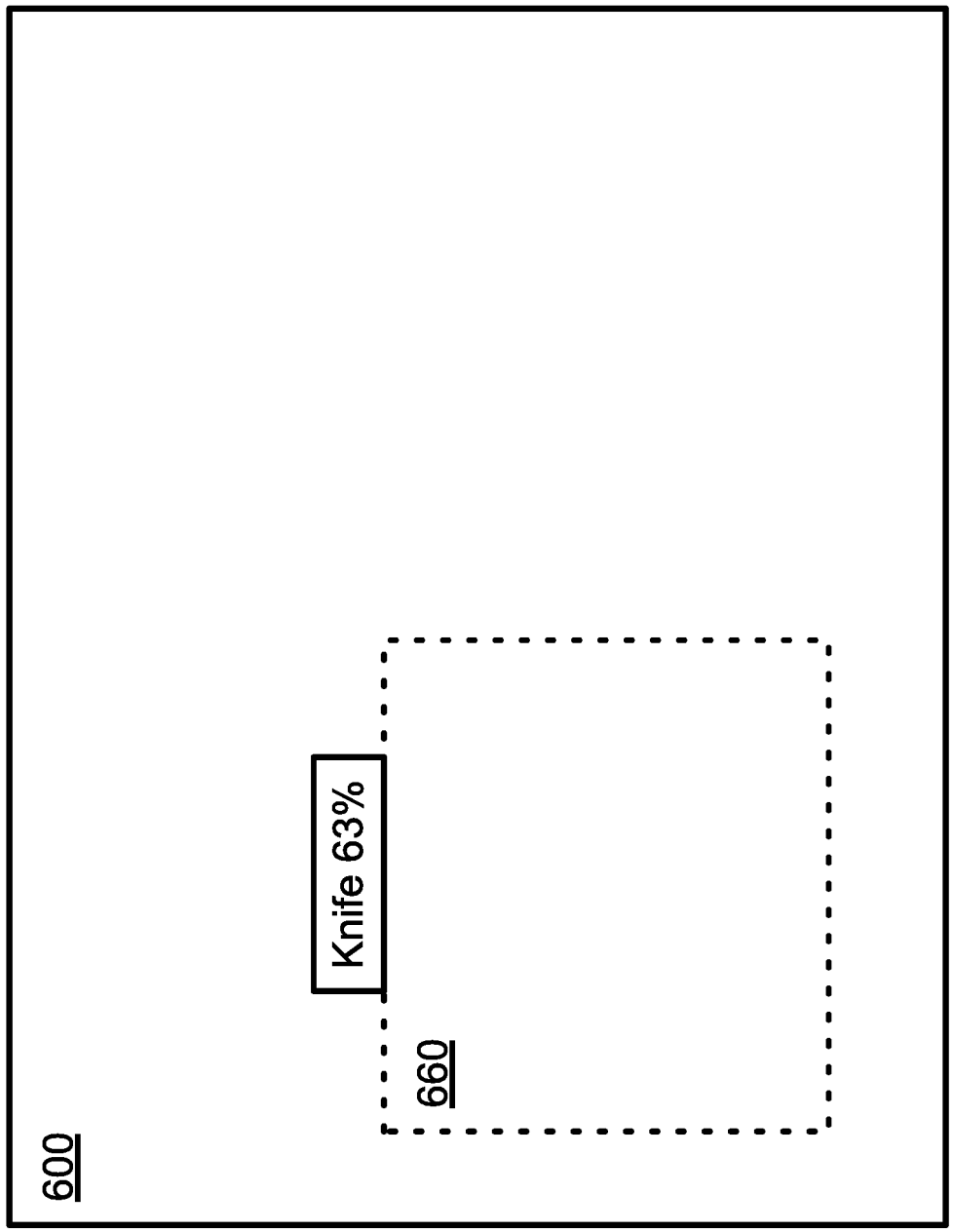

MULTI-MODEL DETECTION OF OBJECTS

BACKGROUND

Computers have been developed to perform various computer-vision tasks. One such computer-vision task that finds particular importance in many aspects of every-day life is object detection, which generally involves a computer processing a given image to identify and localize certain objects of interest within the given image.

Recently, systems have been developed that are capable of performing computer-vision tasks to help aid human screeners (e.g., security personnel at airports, museums, and the like) in identifying objects of interest (e.g., potential security threats, contraband, etc.) that are present on an individual's person and/or that are contained within a piece of baggage, among other locations where objects of interest might be present, from an image of a scene of such a location. Such systems have improved object identification that was traditionally performed by humans.

OVERVIEW

As noted above, traditionally, humans have been tasked with identifying objects of interest within an image of a scene, such as a TSA security screener determining whether an image of a scanned baggage item contains any object deemed to be a security risk (e.g., a gun, knife, etc.). However, humans are generally poor at performing such sporadic visual searching, which is due at least in part to cognitive fatigue. As such, humans typically fail to identify objects of interest within images of scanned scenes, which can result in a variety of negative consequences, such as a gun finding its way onto a passenger train, flight, bus, etc.

Accordingly, computerized systems have been developed to perform object detection on behalf of a human. Typically, object detection refers to the functions of (i) identifying a potential object of interest within an image of a scene, (ii) classifying the object of interest (e.g., by determining that the object belongs to a "gun" or "sharps" class), (iii) determining a confidence level of the classification of the object, and (iv) determining a localization description of the object within the image (e.g., by defining a bounding box for the object within the image).

Recently, computerized systems have become relatively good at performing object detection on images of "simple" scenes. However, existing computerized systems become increasingly poorer at performing object detection as images of scenes become more "complex." For example, some existing systems can accurately perform object detection on an object of interest within an image of a scanned baggage item that contains few objects that are arranged in a manner where there is minimal overlap. On the other hand, the accuracy of existing systems decreases as the number of objects within a scanned baggage item increases, the arrangement of objects becomes more congested, and/or the number of target object-of-interest classes increases.

To help address these as well as other problems with existing object-detection systems, examples disclosed herein provide an object-detection system that utilizes multiple object-detection models to detect objects of interest within images of scenes. Such a system provides a technological improvement over existing systems that rely on a single model to perform object detection and existing systems that rely on multiple models only to perform the classification functions of object detection, which are inherently less complex functions than object detection as a whole. In this regard, the new multi-model object-detection system of this disclosure may provide various technological advantages over existing systems, such as improved object-detection accuracy, improved detection rates, decreased false positives, increased number of supportable object-of-interest classes, and/or facilitating continuous system enhancement, among other advantages.

Alongside providing a technological improvement over existing object-detection systems, a multi-model object-detection system presents its own additional technological challenges that are addressed by the example embodiments disclosed herein. For instance, for a given image, each model of a multi-model system generates its own set of object-detection conclusions (i.e., "inferences") about a particular object of interest within the given image that may include (i) a classification "label" assigned to the particular object of interest (which may form all or part of a "classification conclusion"), (ii) a confidence level of the classification of the particular object of interest (which may form all or part of a "confidence conclusion"), and (iii) a localization description of the particular object of interest within the given image (e.g., the dimensions and/or location of a defined bounding box for the object of interest) (which may form all or part of a "localization conclusion"). A set of object-detection conclusions may include other types of conclusions as well, which may depend on the nature of the given object-detection model.

In practice, the set of object-detection conclusions from a first model of a multi-model system will, at least at times, differ in some respect from the set of object-detection conclusions from a second model of the multi-model system. For example, the first model may classify a particular object of interest a "sharp," while the second model may classify the particular object of interest a "gun." As another example, the first model may define a bounding box for a particular object of interest that confines an area within the given image that differs from that of a bounding box defined by the second model. Thus, a multi-model system is presented with the challenge of determining whether there are multiple objects of interest within the given image and/or whether the two or more competing conclusions are referring to the same object of interest within the given image, among other challenges.

These challenges may be associated with one or more "downstream" actions that may be performed by a multi-model system based on multiple sets of object-detection conclusions. For example, a multi-model system may have to choose which (if any) of multiple, competing object-detection conclusions the multi-model system will use as a basis to present object-detection results to a display of a security screener's workstation or the like. As another example, a multi-model system may have to choose based on multiple, competing object-detection conclusions whether a scanned baggage item should be allowed to pass through a screening system or stopped for further inspection by a baggage handler or the like.

Consequently, a multi-model system is generally presented with the challenge of reconciling discrepancies in its multiple sets of object-detection conclusions in order to generate one set of conclusions for each perceived object of interest within a given image. The new multi-model object-detection system of this disclosure helps to provide a technological solution to this reconciliation challenge.

In example embodiments, a multi-model object-detection system is configured such that it can be coupled to one or more detection devices, such as an X-ray machine, metal detector, Mill scanner, CT scanner, millimeter wave scanner, or other type of scanning device. Each detection device is configured to scan a scene (e.g., a baggage item passing through a screening system, one or more individuals within a given space, etc.) and then provide an image of such a scan to the multi-model object-detection system.

In some implementations, the multi-model object-detection system is configured to be communicatively coupled to some or each of the one or more detection devices via a wide area network (WAN), such as the Internet. For example, the multi-model object-detection system may be cloud based. In other implementations, the multi-model object-detection system is configured to be communicatively coupled to some or each of the one or more detection devices via a local area network (LAN). For example, the multi-model object-detection system may be local to a screening system. In some cases, all or part of the multi-model object-detection system may be physically coupled to some or each of the one or more detection devices, perhaps being integrated therein. For example, the multi-model object-detection system may be physically attached to a screening system in some respect.

In any case, the multi-model object-detection system is configured to receive images of scanned scenes from one or more detection devices and perform multi-model object detection on the received images. In some implementations, performing multi-model object detection may involve the multi-model object-detection system executing two or more object-detection models on each given image that it receives to generate two or more sets of object-detection conclusions. In other implementations, performing multi-model object detection may additionally or alternatively involve the multi-model object-detection system receiving two or more sets of object-detection conclusions for a given image from one or more other systems that are configured to execute object-detection models, perhaps after the multi-model object-detection system transmits the given image to the one or more other systems in the first instance. Other possibilities also exist.

In some example embodiments, the multi-model object-detection system may be configured to first select the two or more object-detection models (e.g., in instances in which there are more than two object-detection models available) that are to generate the object-detection conclusions for the given image, which the multi-model object-detection system may perform in a variety of manners. As one possibility, the multi-model object-detection system may select the two or more object-detection models based on a variety of factors that inform the multi-model object-detection system about which two or more object-detection models would be most suitable for performing object-detection for the given image, such as the vendor, manufacturer, or the like that designed the model and/or the type of training data that was used to train the model, among other factors. As another possibility, the multi-model object-detection system may select the two or more object-detection models based on the output of a machine-learning model (e.g., at least one neural network) that receives as input the given image and outputs an indication that informs the multi-model object-detection system about which two or more object-detection models would be most suitable for performing object detection for the given image, such as an indication of one or more characteristics of the image (e.g., the image is considered to be "complex," the image comprises high-density areas, etc.). In some cases, such a machine-learning model may have been trained or otherwise updated based on "continuous learning" functionality that is discussed later.

In any event, each of the two or more object-detection models was trained (e.g., using supervised or unsupervised learning techniques) based on training image data to identify one or more particular objects of interest within images. As a result of such training, each object-detection model is configured to receive a given image as input and then output a set of object-detection conclusions regarding the given image, which may include some or all of a classification conclusion, a confidence conclusion, and a localization conclusion, among other possible conclusions.

Each particular object-detection model may take a variety of forms. For example, some or each of the two or more object-detection models may take the form of a machine-learning object-detection model (e.g., a neural-network based object-detection model), a rules-based object-detection model (e.g., an Explosive Detection System model), or some other computer-vision based object-detection model, among other forms of object-detection models. In some instances, some or each of the two or more object-detection models may include or otherwise take the form of one or more single-stage or multi-stage object-detection models, which in turn may include one or more neural-network based object-detection models (e.g., YOLO, SSD, AlexNet, RetinaNet, VGGNET, FPN, R-CNN, Fast R-CNN, Faster R-CNN, Mask R-CNN, etc.), among other possibilities.

Notably, the two or more object-detection models may differ in at least one characteristic. For example, the two or more object-detection models may have been trained to identify different objects of interest (e.g., a first model was trained to identify "guns" and a second model was trained to identify "sharps"). As another example, the two or more object-detection models may have been trained to identify the same object of interest but were trained differently, such as by using different training sets (e.g., a first model was trained on adversarial image data and a second model was trained on general image data) and/or training parameters, among other possibilities. As yet another example, the two or more object-detection models may have been trained to identify the same object of interest but were designed by different vendors, manufacturers, or the like. As a further example, the two or more object-detection models may have been trained to identify the same object of interest but have different architectures (e.g., a first model with a YOLO architecture and a second model with a Faster R-CNN architecture). Other example characteristics by which two models can differ are also possible.

As a result of the two or more object-detection models differing in some respect, the two or more sets of object-detection conclusions that are output by the two or more object-detection models may include at least one conclusion that differs between the two models. For example, a first model's classification conclusion may include a "gun" label, whereas a second model's classification conclusion may include a "knife" label. As another example, a first model's localization conclusion may define a bounding box for an object of interest that is larger in area than a second model's defined bounding box. Other examples are also possible, some of which are discussed below.

In any case, after the multi-model object-detection system identifies two or more sets of object-detection conclusions for a given image, to the extent that a discrepancy exists between the conclusions in the two or more sets, the multi-model object-detection system functions to perform a "reconciliation" process that generally involves resolving any discrepancies between sets of object-detection conclusions to derive a single set of conclusions for a given perceived object of interest within the given image. In practice, the multi-model object-detection system may perform such a process in a variety of manners.

As one possibility, the multi-model object-detection system may be configured to begin by determining whether the two or more localization conclusions from the two or more sets of object-detection conclusions correspond to the same or substantially similar location within the given image. In example embodiments, the multi-model object-detection system may perform this function by determining whether the localization descriptions from the two or more sets of object-detection conclusions are comparable, such as by determining whether the bounding boxes defined by the two or more object-detection models overlap or are otherwise proximate to one another. Other manners of determining whether localization conclusions correspond to the same or substantially similar location within the given image are also possible.

When two or more localization conclusions are determined to be the same or substantially similar, the multi-model object-detection system may infer that these two or more conclusions correspond to the same perceived object of interest within a given image. For example, when multiple bounding boxes overlap (or are within a threshold distance from one another), the multi-model object-detection system is configured to conclude that the sets of object-detection conclusions corresponding to these bounding boxes refer to the same perceived object of interest within the given image. The multi-model object-detection system may infer that two or more sets of object-detection conclusions correspond to the same perceived object of interest within a given image in other manners as well, such as based on a similarity between classification conclusions.

In some cases, if the multi-model object-detection system determines that the two or more localization conclusions from the two or more sets of object-detection conclusions correspond to the same or substantially similar location within a given image (e.g., the bounding boxes do overlap), then the multi-model object-detection system may determine whether one of the confidence conclusions from the two or more sets of object-detection conclusions is above a predetermined threshold value. If so, then the multi-model object-detection system may select that corresponding set of object-detection conclusions over the one or more other sets of object-detection conclusions. Otherwise (and in some embodiments, even when a confidence conclusion is above the predetermined threshold value), the multi-model object-detection system may proceed with reconciliation. In some implementations, in instances where two or more confidence conclusions are above the predetermined threshold value, the multi-model object-detection system may select the set of object-detection conclusions corresponding to the highest confidence level or the multi-model object-detection system may proceed with reconciliation.

In any event, the multi-model object-detection system may continue with the reconciliation process by determining the extent of similarity between the two or more localization conclusions, which the multi-model object-detection system may determine in a variety of manners. As one possibility, the multi-model object-detection system may first identify a particular point (e.g., a "vertex") within each localization conclusion, such as by finding a center point within each localization conclusion's defined bounding box.

If two localization conclusions are substantially similar (e.g., they overlap or are otherwise proximate to one another), then the multi-model object-detection system may define a connection between the two localization conclusions. For example, the multi-model object-detection system may generate a line (e.g., an "edge") connecting the identified vertices of the overlapping bounding boxes.

The multi-model object-detection system may then quantify the localization conclusions' degree of similarity. For example, the multi-model object-detection system may assign a value to each generated line that connects two bounding boxes, where this assigned value quantifies the bounding boxes' degree of overlap with one another, such as by determining intersection over union (IoU) values for the bounding boxes.

Next, the multi-model object-detection system may define one or more partitions (e.g., "cliques") based on the localization conclusions such that each partition (i) includes no more than one localization conclusion from any given object-detection model and (ii) maximizes the degree of similarity between the localization conclusions. The multi-model object-detection system may define the one or more partitions in a variety of manners.

As one possible approach, the multi-model object-detection system may first generate an initial partition for each vertex (and thus, for each bounding box). For each given initial partition, the multi-model object-detection system may then determine whether the given partition should be merged with one or more other partitions.

In one particular implementation, the multi-model object-detection system may perform a merging function by (i) identifying any generated lines that connect the given partition's vertex to another partition's vertex and (ii) excluding any identified lines that connect the given partition's vertex to another partition's vertex that corresponds to a bounding box that was defined by the same object-detection model that defined the bounding box corresponding to the given partition's vertex. Next, the multi-model object-detection system may evaluate the assigned weight of any remaining identified lines and identify a merging vertex corresponding to the endpoint of the remaining line that has the maximum assigned weight. The multi-model object-detection system may then merge the given partition with the partition corresponding to the identified merging vertex.

In operation, the multi-model object-detection system may evaluate any remaining initial partitions for potential merging but with each merged partition comprising its original vertex along with any merging vertices. In this way, the multi-model object-detection system defines one or more partitions that each refer to the same perceived object of interest within the given image.

After the multi-model object-detection system defines the one or more partitions from the localization conclusions, it then selects a representative partition for the given perceived object of interest in the given image that forms the basis for the multi-model object-detection system to derive a single set of object detection conclusions for the given perceived object. The multi-model object-detection system may select the representative partition in a variety of manners.

As one possibility, the multi-model object-detection system may utilize a "voting" scheme to select the representative partition in which each object-detection model provides a "vote" for each partition that contains a vertex corresponding to the given model.

In example implementations that utilize a "voting" scheme, the weight (e.g., value) of a "vote" may be the same for each object-detection model (e.g., each model's "vote" has a value of one) or may differ between the object-detection models. Moreover, the weight of a given object-detection model's "vote" may be constant (i.e., predefined) or it may dynamically change over time. In practice, the weight of a given object-detection model's "vote" may be determined (i) based on a variety of factors (e.g., the vendor, manufacturer, or the like that designed the model, the type of training data that was used to train the model, the model's architecture type, etc.), (ii) based on the output of a machine-learning model that receives as input the given image, as well as at least a portion of each model's object-detection conclusions, and outputs an indication of how each model's "vote" should be weighted, and/or (iii) based on the results of "continuous learning" functionality discussed below, among other possibilities.

After the multi-model object-detection system applies the applicable weights of the "votes" of each object-detection model to the one or more partitions, the multi-model object-detection system may then select the representative partition based on the relative weights of the one or more partitions. As one example, the multi-model object-detection system may select the partition that received a predefined threshold amount of the "votes," such as a 50% threshold or that received the most "votes" out of the one or more partitions, among other possibilities.

In any case, after the multi-model object-detection system selects the representative partition for the given perceived object of interest in the given image, the multi-model object-detection system is capable of completing the reconciliation process by generating and outputting a single, reconciled set of conclusions for the given object of interest in the given image. In practice, the multi-model object-detection system generating the reconciled set of conclusions based on the representative partition may involve determining (i) a representative classification label, (ii) a representative confidence value, and/or (iii) a representative localization description of the given perceived object of interest in the given image (e.g., the dimensions and/or location of a representative bounding box for the object of interest within the given image).

To the extent that the multi-model object-detection system determines that the given image contains any additional perceived objects of interest, it will then repeat the above-discussed process for each additional perceived object of interest. In any case, one of ordinary skill in the art will appreciate that the multi-model object-detection system described herein more accurately detects objects of interest and has lower false positive rates, among other advantages, compared to existing systems.

In example embodiments, the multi-model object-detection system may be configured to perform one or more functions based on (i) the output of one or more of the functions performed during reconciliation and/or (ii) the ultimate output of the reconciliation process as a whole (i.e., the reconciled set of object-detection conclusions).

As one possibility, the multi-model object-detection system may present one or more indications of one or more of the representative conclusions from the reconciled set of object-detection conclusions at a computer display or the like. For example, the multi-model object-detection system may present a graphical visualization of a bounding box and/or label for a given object of interest at a security screener's workstation at a screening checkpoint at an airport or the like.

Similarly, the multi-model object-detection system may, based on one or more of the representative conclusions from the reconciled set of object-detection conclusions, present one or more notifications related to the scene that was originally scanned at a computer display or the like. For example, based on the reconciled set of object-detection conclusions, the multi-model object-detection system may cause a display at a security screener's workstation to show a visualization for a scanned baggage item only when an object of interest within the baggage item that is identified in the reconciled set of object-detection conclusions is deemed to be a security interest. Otherwise, the multi-model object-detection system may forego causing the display to show any visualization for a scanned baggage item.

As another possibility, the multi-model object-detection system may, based on one or more of the representative conclusions from the reconciled set of object-detection conclusions, cause a notification or the like to be presented at a particular computing device (e.g., a wearable computing device, mobile phone, etc.) that is part of or otherwise associated with a screening system, such as a text-message or app notification to a computing device assigned to a baggage handler at a screening checkpoint.

As yet another possibility, the multi-model object-detection system may, based on one or more of the representative conclusions from the reconciled set of object-detection conclusions, cause an operation to occur at a screening system, such as a "pass-through" operation.

For instance, many screening systems include a conveyor belt on which a baggage item or the like moves past one or more detection devices, which then capture one or more images of the baggage item. In traditional screening systems, a security screener's workstation includes a user interface (e.g., a button or the like) that controls the conveyor belt such that the security screener manually controls the flow of baggage items through the system. Typically, by default, the conveyor belt only moves, and thus baggage items only pass through the system, when the security screener provides an input to engage the conveyor belt's movement. When such an input is provided by the security screener, the baggage item (i) passes by the one or more detection devices that scan the baggage item and (ii) proceeds through the scanning area of the system to a "main" lane where the baggage item's owner retrieves the item. On the other hand, when the security screener identifies a potential security interest in a scanned image of the baggage item, depending on the nature and/or sophistication of the screening system, the security screener typically either (i) stops the conveyor belt or otherwise declines to pass the baggage item through to the "main" lane and manually moves the baggage item to a "search" lane where a baggage handler retrieves the baggage item and searches through its contents or (ii) provides an input at a user interface (e.g., a button or the like at a workstation of screening system comprising a "smart" lane) that diverts the baggage item to a secondary conveyor belt where a baggage handler retrieves the baggage item and searches through its contents.

In example embodiments, the multi-model object-detection system causing a pass-through operation to occur at a screening system based on the reconciled set of object-detection conclusions for a given image of a baggage item (or the like) may involve causing the screening system to automatically cause the baggage item to no longer pass through to the "main" lane and instead proceed to the "search" lane, such as by causing an actuator or the like to automatically divert the baggage item into the "search" lane or by causing the baggage item to be diverted to a secondary conveyor belt (e.g., when the screening system is equipped with or otherwise comprises a "smart" lane). In this way, the multi-model object-detection system may promote high throughput at the screening system along with improved object-detection accuracy and may also help reduce the number of human operators that are required at a given screening checkpoint.

Likewise, the multi-model object-detection system causing a pass-through operation to occur at a screening system based on the reconciled set of object-detection conclusions for a given image of a baggage item (or the like) may involve causing the screening system to automatically start or stop a conveyor belt of the screening system without requiring control inputs from the human screener. For instance, when the reconciled set of object-detection conclusions indicates that no object of interest is present within the baggage item, the multi-model object-detection system may cause the conveyor belt to automatically start (or continue moving), thereby overriding the screening system's default settings and passing the baggage item through the system to the "main" lane for retrieval by the baggage item's owner. On the other hand, in some security systems that, by default, have a conveyor belt that continuously moves passing baggage items through until the system receives a "stop" input from a human screener, the multi-model object-detection system may cause the conveyor belt to automatically stop when the reconciled set of object-detection conclusions indicates that an object of interest that is deemed to be a security interest is present within the baggage item, thereby overriding the screening system's default settings.

Notably, in instances where the multi-model object-detection system is configured to stop a conveyor belt of a screening system, the multi-model object-detection system may also configure the screening system such that a human screener's ability to cause the conveyor belt to continue moving may be deactivated until an additional event occurs (i.e., other than the system receiving an input at the user interface that starts/stop the conveyor belt), such as the human screener providing an input indicating that the multi-model object-detection system's object detection has been acknowledged, the human screener or his/her supervisor providing certain credentials or the like at the screening system, etc.

The multi-model object-detection system may cause various other operations to occur at a screening system based on one or more of the representative conclusions from the reconciled set of object-detection conclusions.

As suggested above, in example embodiments, the multi-model object-detection system may be configured to receive feedback data based on actions that occur at a screening system or the like, such as a screening system where a scene was scanned and an indication of the multi-model object-detection system's multi-model object detection was output. For example, a human at a screening system may provide an input at a workstation or the like that (i) provides an indication of whether the object-detection system's multi-model object detection was correct or not (either in whole or in part), (ii) provides an indication that the multi-model object-detection system failed to detect an object of interest within an image that an operator detected, or (iii) provides an indication of a human's classification of an object within an image (e.g., a human-entered label for an object that may or may not be deemed a security interest), among other possibilities. In practice, such inputs may take the form of direct feedback on the object-detection system's multi-model object detection (e.g., by a human viewing a visual representation of the multi-model object detection and then using a GUI to "x-out" incorrect detections, by a baggage handler providing an input at a computing device confirming that a baggage item contained a security threat, etc.), and/or such inputs may take the form of indirect feedback (e.g., conveyor belt actions taken by a human operator, etc.).

Based on feedback data from actions that occurred at a screening system or the like, the multi-model object-detection system may be configured to update the multi-model object-detection process in a variety of manners. For example, the feedback data may result in new or updated labeled training data that can be used to update some or all of the multi-model object-detection system's two or more object-detection models. As another example, the feedback data may result in modifying a given object-detection model's probability threshold (e.g., the feedback data may indicate that there are relatively frequent false alarms on "sharps," and as a result, a probability threshold for an object-detection model trained to detect "sharps" may be increased). Other examples are also possible. Moreover, the updating of the multi-model object-detection process may occur "on the fly" (e.g., after each image is processed and an applicable output is provided to a screening operator) or the updating may occur periodically (or as a "batch), such as every 24 hours, every week, etc.

Relatedly, as discussed above, in example embodiments, the multi-model object-detection system may be configured to perform "continuous learning," which generally involves the multi-model object-detection system receiving feedback data regarding the performance of the two or more object-detection models and then updating an aspect of the multi-model object-detection process based on the feedback data. In practice, such feedback data may be a result of the multi-model object-detection process itself and/or may be received as a result of human actions with respect to the object-detection system's multi-model object detections. In any case, the multi-model object-detection system may perform continuous learning in a variety of manners.

In one respect, the multi-model object-detection system may be configured to evaluate a given object-detection model's performance over time and based on the evaluation, modify the weight of the given object-detection model's "vote." For example, the multi-model object-detection system may determine that a first object-detection model's set of conclusions has been deemed correct more than a first threshold amount of times (e.g., the multi-model object-detection system historically selects a representative partition that includes a vertex corresponding to the first object-detection model), and as a result, the multi-model object-detection system may increase the weight of the first object-detection model's "votes." On the other hand, the multi-model object-detection system may determine that a second object-detection model's set of conclusions has been deemed correct less than the first threshold amount of times (and perhaps less than a second, lower threshold amount), and as a result, the multi-model object-detection system may decrease the weight of the second object-detection model's "votes."

In another respect, the multi-model object-detection system may be configured to evaluate a given object-detection model's performance over time and based on the evaluation, modify whether the given object-detection model should be combined with certain other object-detection models. For example, the multi-model object-detection system may determine that a first object-detection model's detection of a first class of objects of interest (e.g., "liquids") has been deemed correct more than a threshold amount of times, and a second object-detection model's detection of a second class of objects of interest (e.g., "sharps") has been deemed correct more than the threshold amount of times. As a result, the multi-model object-detection system may modify its multi-model object-detection process such that the first and second object-detection models are not used together (or that such a combination is demoted in priority among other combinations) since each model is relatively good at detecting different classes of objects. As another example, the multi-model object-detection system may determine that a first object-detection model's detection within a "side view"

image of a scene historically matches a second object-detection model's detection within a "top view" image of the scene. As a result, the multi-model object-detection system may modify its multi-model object-detection process such that the first and second object-detection models are used together in a manner such that the first object-detection model evaluates "side view" images of scenes and the second object-detection model evaluates "top view" images of scenes. Other examples are also possible.

In yet another respect, the multi-model object-detection system may be configured to not only consider feedback data for a given object-detection model's performance, but also additional data related to the given object-detection model's object detections (e.g., the image data used in the object detection, external contextual data related to the scene that was scanned, etc.), and based on such an evaluation, update an aspect of the multi-model object-detection process. For example, the multi-model object-detection system may determine that a first object-detection model is historically most accurate when evaluating "complex" images (e.g., images of cargo containers that are cluttered) or when evaluating images with high-density areas (e.g., images of mail packages that contain metals), and as a result, when a given image has such features, the multi-model object-detection system may select the first object-detection model in the first instance and/or increase the weight of the first object-detection model's "votes." As another example, the multi-model object-detection system may determine that a first object-detection model is historically most accurate when analyzing images that were scanned at certain times of year at a particular geographical location, and as a result, the multi-model object-detection system may select the first object-detection model in the first instance and/or increase the weight of the first object-detection model's "votes" when external contextual data (e.g., time-of-year and/or geo-location data) indicates that such conditions are present at the location of the detection devices from which images are received. Other examples are also possible.

In some or all of the above examples of "continuous learning," the multi-model object-detection system may be configured to utilize one or more machine-learning models that are trained or otherwise updated based on feedback data by applying one or more machine-learning techniques (e.g., neural networks, regression, random forest, support vector machines (SVM), Naive Bayes, decision trees, dimensionality reduction, k-nearest neighbor (kNN), gradient boosting, etc.). Once trained or otherwise updated, these one or more machine-learning models may be configured to receive as input image data of a scanned scene, and perhaps external contextual data for the scanned scene, and then output an indication that informs the multi-model object-detection system's decision of which particular object-detection models would be most accurate for the given situation and/or of what weight should be applied to each model's respective "vote."

Accordingly, in one aspect, disclosed herein is a computer-implemented method that involves (i) receiving an image of a scene that was scanned by a detection device of a screening system, wherein the image comprises an object of interest; (ii) identifying at least a first set of object-detection conclusions for the image generated by a first object-detection model and a second set of object-detection conclusions for the image generated by a second object-detection model, wherein at least one conclusion discrepancy exists between the first and second set of object-detection conclusions; (iii) resolving the at least one conclusion discrepancy by: (a) determining a measure of similarity between a first localization conclusion from the first set of object-detection conclusions and a second localization conclusion from the second set of object-detection conclusions, wherein the first and second localization conclusions were both determined to refer to the object of interest; (b) defining a plurality of candidate partitions, wherein at least one candidate partition of the plurality of candidate partitions is defined based on the measure of similarity between the first and second localization conclusions; and (c) based on a weight assigned to the at least one candidate partition, deriving a reconciled set of object-detection conclusions for the object of interest from the first and second set of object-detection conclusions, thereby resolving the at least one conclusion discrepancy; and (iv) based on the reconciled set of object-detection conclusions, determining that the image of the scene comprises the object of interest.

In another aspect, disclosed herein is a computing system that comprises at least one processor, a non-transitory computer-readable medium, and program instructions stored on the non-transitory computer-readable medium that are executable by the at least one processor to cause the computing system to perform one or more of the functions disclosed herein, including but not limited to the functions of the foregoing computer-implemented method.

In yet another aspect, disclosed herein is a non-transitory computer-readable medium comprising program instructions stored thereon that are executable by at least one processor to cause a computing system to perform one or more of the functions disclosed herein, including but not limited to the functions of the foregoing computer-implemented method.

One of ordinary skill in the art will appreciate these aspects, as well as numerous other aspects, in reading the following disclosure.

BRIEF DESCRIPTION OF THE DRAWINGS

FIG. 6G provides a conceptual illustration of an example image of a scanned scene with a reconciled set of object-detection conclusions.

DETAILED DESCRIPTION

The disclosure presented herein makes reference to several example embodiments and implementations and the accompanying figures. One of ordinary skill in the art should understand that such references are for the purposes of clarity and explanation only and are not meant to be limiting. Indeed, part or all of the disclosed systems, devices, and/or processes may be rearranged, combined, added to, and/or omitted in a variety of manners, each of which is contemplated herein.

I. Example System Configuration

Figure 1:
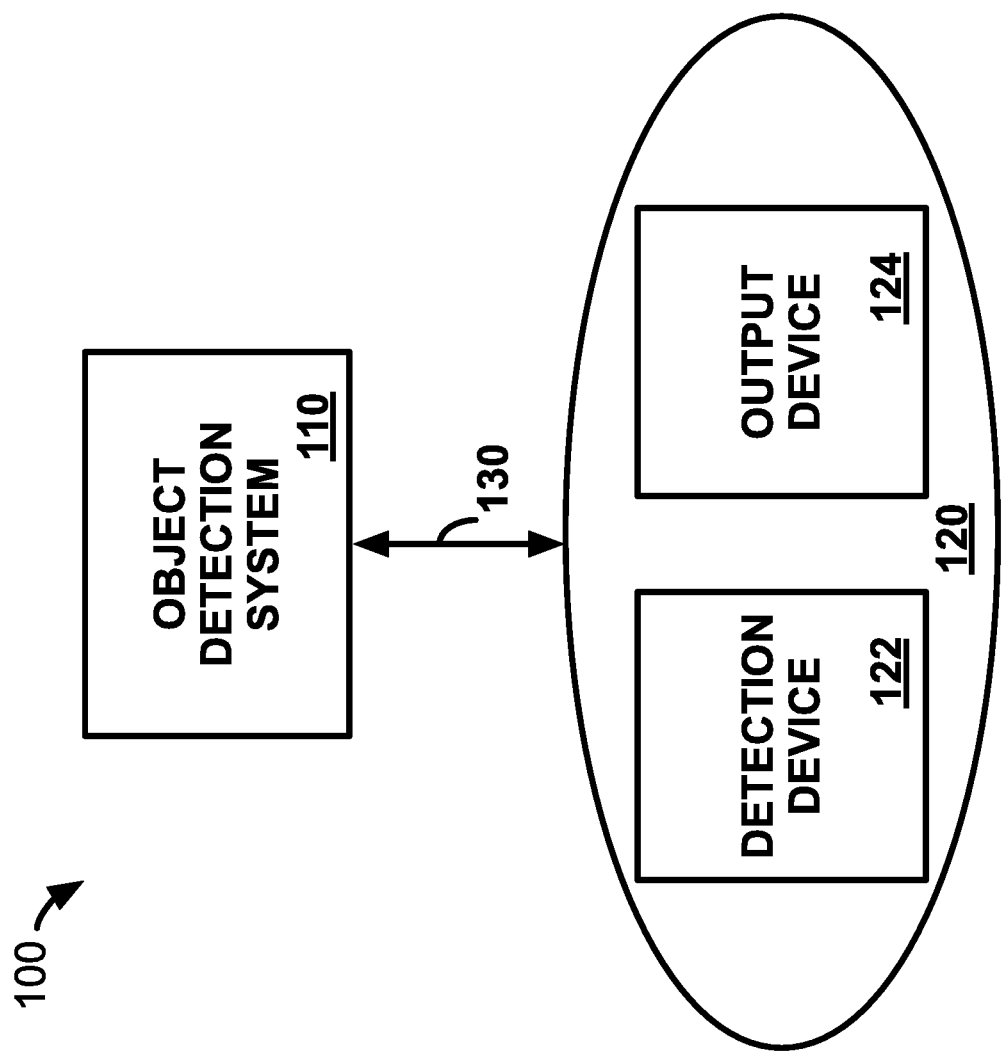
FIG. 1 provides an example system configuration in which example embodiments may be implemented.

FIG. 1 illustrates an example system configuration 100 in which example embodiments may be implemented. As shown, the system configuration 100 includes at its core an object-detection system 110 that is coupled to one or more screening systems 120 by one or more links 130.

In practice, each screening system 120 is located at a screening checkpoint at a particular geographic location, which may include multiple screening systems 120 that are communicatively coupled with one another, such as at an airport or the like. Each screening system 120 includes at least one detection device 122 that is configured to scan or otherwise capture one or more images of a scene. Each detection device 122 can take a variety of forms, including but not limited to an X-ray machine, metal detector, MRI scanner, CT scanner, millimeter wave scanner, spectral band scanner, or other type of scanning device.

In general, a scene comprises a two-dimensional (2D) area or three-dimensional (3D) space that can be scanned by at least one detection device 122 at a given point in time during which the area or space may contain one or more objects. There are various examples of scenes, such as a region within a screening system where baggage items, cargo containers, mail packages, etc. pass through to be scanned, a region within a screening system where a human stands to get scanned, or a region within a public location or the like where a crowd of individuals is scanned, among numerous other examples of scenes.

Likewise, there are various examples of objects that may be within a scene, such as a baggage item (e.g., a purse, briefcase, piece of luggage, backpack, etc.), a human, a freight or cargo container, and mail or other packages, among numerous other examples. In practice, an object that is within a scanned scene typically also contains one or more objects itself (e.g., electronics, wallets, keys, books, clothing, food, lighters, contraband, etc.), and some of these objects may be considered an object of interest at a particular screening system 120.

In general, an object of interest is an object that has one or more characteristics of an object within a type or class that has been deemed to be of interest (e.g., a security threat) such that additional attention should be given to the object. Some examples of objects of interest may include guns, sharps (e.g., knives and the like), liquids, explosives, lighters, certain electronics, and objects that are traditionally not of interest but that have been modified in a certain manner, among numerous other examples.

In operation, each screening system 120 is assigned one or more different objects of interest, and those one or more objects of interest may depend on the type, nature, and/or location of a particular screening system 120, among other factors. Moreover, the objects of interest for a particular screening system 120 may be static once defined or dynamically updateable. For instance, the one or more objects of interest for a given screening system 120 may change when a security-threat level or the like for a geographic area nearby the given screening system 120 changes.

In any event, the object-detection system 110 may receive and store data reflecting the respective one or more objects of interest for each particular screening system 120. In example implementations, this data may indicate one or more object-detection requirements for each particular screening system 120, such as a particular set of objects of interest and/or particular criteria for flagging such objects of interest (e.g., minimum confidence levels, etc.). In practice, the object-detection system 110 may receive this data from the screening systems 120 themselves and/or another system that is communicatively coupled to the object-detection system 110.

As noted above, each detection device 122 is configured to capture one or more images of a scene. In some implementations, a detection device 122 may capture a single image of a scene. In other implementations, a detection device 122 may capture multiple, different images of a scene. The multiple images may be from the same, single perspective or from multiple, different perspectives (e.g., a top-view image and a side-view image of a given piece of luggage). In some cases, the one or more images may comprise three-dimensional "slices" of a scene, where each slice represents a scan of the scene at a different level of scan depth.

In practice, each detection device 122 is configured to represent its one or more captured images using one or more data representations. For example, the captured images may be represented using pixels, voxels, polygons, three-dimensional slices, or any other type of data structure that may be used to construct 2D or 3D image data. Each of the one or more captured images may comprise a low-level representation of a scanned scene or a high-level representation of a scanned scene, among other possibilities. In some cases, the captured images may be represented according to a standard format, such as the Digital Imaging and Communications in Security (DICOS) format, among other possibilities. Moreover, each detection device 122 may be configured to generate metadata for a given captured image that describes various aspects of the scene, such as material density, geometric dimensions, atomic numbers, and/or spectral data corresponding to part or all of a given captured image, among other aspects.

After a detection device 122 captures one or more images of a scene, it may then output image data for the captured one or more images to a variety of devices. As one possibility, a detection device 122 may provide images to one or more output devices 124 of the screening system 120 that the detection device 122 is a part of. In general, each output device 124 of a screening system 120 takes the form of a computing device that is configured to provide a visual, audible, tactile, and/or other sensory output in response to one or more of the object-detection related functions described herein. In this regard, each output device 124 may include at least one of a display, speaker, vibration mechanism, or some other user-output component, among other components. Examples of output devices 124 include stationary computing devices (e.g., a computer that is part of a workstation at a screening system 120) and mobile computing devices that are communicatively coupled to a screening system 120 via a wireless network (e.g., smartphones, tablets, wearable computing devices), among other possibilities.

As another possibility, a detection device 122 may transmit image data for the captured one or more images to the object-detection system 110 via one or more of the links 130. In some implementations, the object-detection system 110 is communicatively coupled to some or all of the screening systems 120 via a wide area network (WAN), such as the Internet, and so, the one or more links 130 may take the form of one or more wired and/or wireless communication paths that facilitate WAN communications. In other implementations, the object-detection system 110 is communicatively coupled to some or all of the screening systems 120 via a local area network (LAN), and so, the one or more links 130 may take the form of one or more wired and/or wireless communication paths that facilitate LAN communications. In yet other implementations, the object-detection system 110 is communicatively coupled to some or all of the screening systems 120 via a combination of one or more WANs and one or more LANs.

In some cases, all or part of the object-detection system 110 is physically coupled to some or all of one or more screening systems 120, such as via a serial bus or other connection mechanism. In this respect, all or part of the object-detection system 110 may be integrated with one or more of the screening systems 120. In other cases, all or part of the object-detection system 110 is located remote from one or more of the screening systems 120. For instance, the object-detection system 110, or portions thereof, may be implemented in the cloud, whereas each screening system 120 may be located at an airport, train station, bus stop, mail-sorting facility, cargo center, etc., among other possibilities. In any of the aforementioned arrangements, the object-detection system 110 may be configured to interface with a screening system 120 that may be manufactured by a third party (i.e., a different manufacturer than that of the object-detection system 110 itself), such as an Astrophysics screening system, a Rapiscan screening system (e.g., current Rapiscan systems include Rapiscan 618XR HP, 620XR HP, 622XR HP, 618XR, 620XR, 620DV, or 622XR), or a Smiths screening system, among other examples.

II. Example Object-Detection System

In general, the object-detection system 110 is configured to perform object-detection functions based on images of scenes from the one or more screening systems 120. In example embodiments, object detection may involve some or all of the following functions: (i) identifying a perceived object of interest within an image of a scene, (ii) classifying the perceived object of interest (e.g., by determining that the object belongs to a "gun" or "sharps" class), (iii) determining a confidence level of the classification of the perceived object of interest, and (iv) determining a localization description of the perceived object of interest within the image (e.g., by defining a bounding box for the perceived object of interest within the image).

Figure 2:
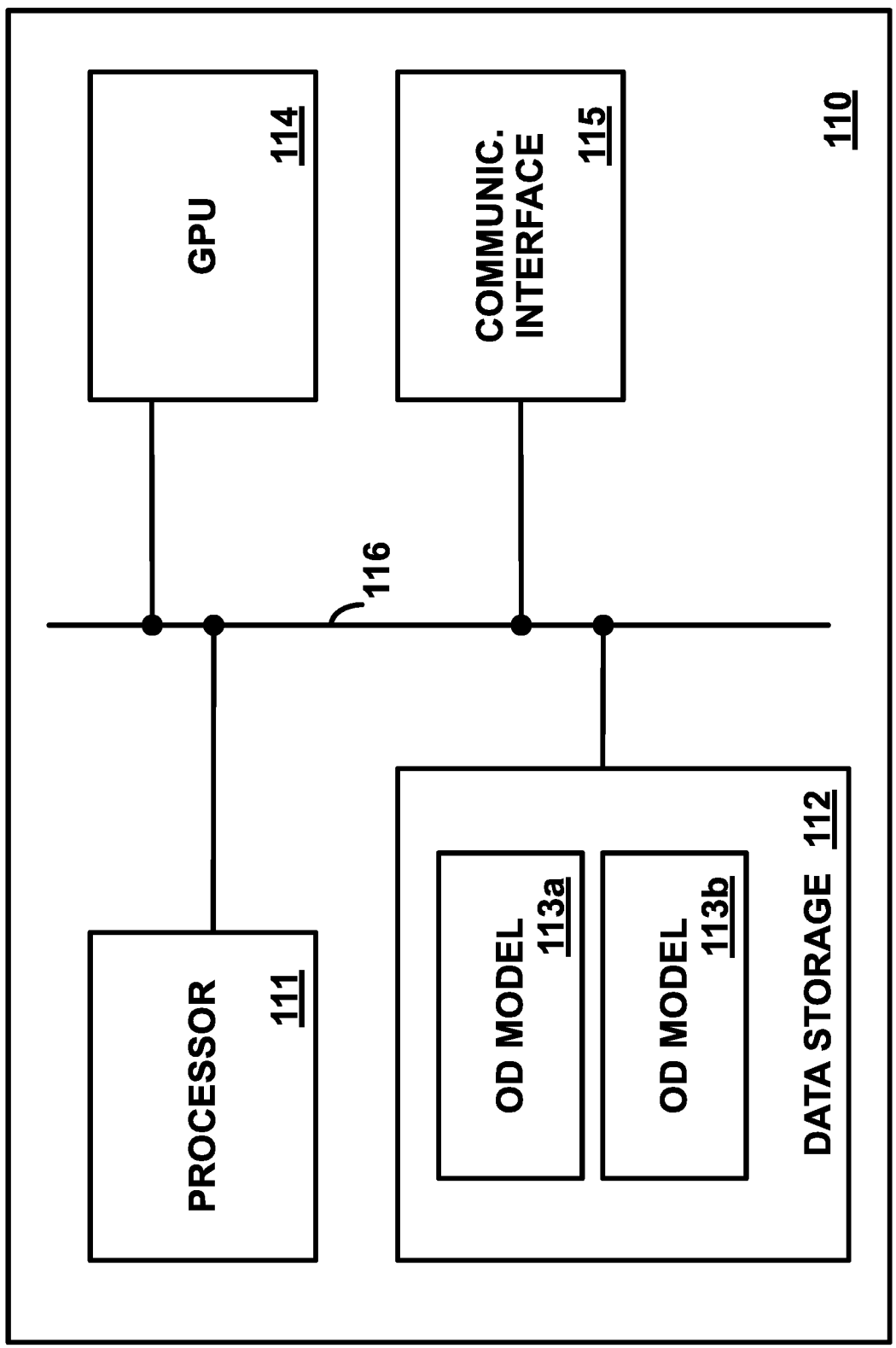
FIG. 2 provides a simplified block diagram showing some components that may be included in an object-detection system.

FIG. 2 is a simplified block diagram illustrating some components that may be included in the object-detection system 110. In practice, the object-detection system 110 may include one or more computer devices that function together to perform object detection, and these one or more computer devices may collectively include at least one processor 111, data storage 112, at least one graphics processing unit (GPU) 114, and at least one communication interface 115, all of which may be connected by a communication link 116 that may take the form of a system bus or some other connection mechanism.

The processor 111 may include one or more processors components, such as one or more general-purpose processors, one or more special-purpose processors, and/or one or more programmable logic devices, among other types of processors. In some instances, the processor 111 may include one or more central processing units (CPUs), field programmable gate array (FPGAs), application-specific integrated circuits (ASICs), or any combination thereof. The processor 111 may take various other forms as well.

The data storage 112 may include one or more non-transitory computer-readable storage mediums, such as volatile storage mediums (e.g., random-access memory, registers, cache, etc.) and non-volatile storage mediums (e.g., read-only memory, a hard-disk drive, a solid-state drive, flash memory, an optical-storage device, etc.), among other examples. The data storage 112 includes software that enables the object-detection system 110 to perform the functions disclosed herein. In this respect, the software may take the form of one or more sets of program instructions that are executable by the processor 111 to cause the object-detection system 110 to carry out the functions disclosed herein.

Moreover, as shown in FIG. 2, the data storage 112 may be provisioned with one or more object-detection models 113a, 113b. In embodiments in which the data storage 112 is provisioned with two or more object-detection models 113a-b, the object-detection system 110 may be configured as a multi-model object-detection system. Although the object-detection system 110 shown in FIG. 2 only includes two object-detection models 113a-b, that should not be construed as limiting. Indeed, it should be appreciated that the object-detection system 110 may include more than two object-detection models.

In general, each object-detection model 113a-b is configured to receive a given image of a scanned scene, evaluate the given image for one or more objects of interest, and then generate one or more sets of object-detection conclusions for the given image. Each set of object-detection conclusions may include one or more conclusions (i.e., "inferences") about a given perceived object of interest within the given image that may include some or all of (i) a classification "label" assigned to the given perceived object of interest (which may form all or part of a "classification conclusion"), (ii) a confidence level of the classification of the given perceived object of interest (which may form all or part of a "confidence conclusion"), and/or (iii) a localization description of the given perceived object of interest within the given image (e.g., the dimensions and/or location of an appropriate bounding box for the given perceived object of interest that may be defined by a set of coordinates or the like) (which may form all or part of a "localization conclusion"). A set of object-detection conclusions may alternatively or additionally include one or more other types of object-detection conclusions, which may depend on the nature of the given object-detection model generating the set of object-detection conclusions. In practice, a given object-detection model 113a-b may, at times, generate multiple sets of object-detection conclusions for the same perceived object of interest within a given image.

Each object-detection model 113a-b may take a variety of forms. For example, some or each of the object-detection models 113*a-b* may take the form of a machine-learning object-detection model, a rules-based object-detection model, or some other form of computer-vision based object-detection model, among other possibilities. In example implementations, each object-detection model 113*a-b* may take the form of one or more single-stage or multi-stage object-detection models. Likewise, each object-detection model 113*a-b* may take the form of one or more neural-network based object-detection models, each of which is designed according to a particular type of architecture (e.g., YOLO, SSD, AlexNet, RetinaNet, VGGNET, FPN, R-CNN, Fast R-CNN, Faster R-CNN, Mask R-CNN, etc.), among other possibilities. Additional functional details regarding object-detection models 113*a-b* are discussed below.

In practice, the two or more object-detection models 113*a-b* may differ in at least one characteristic. For example, the two or more object-detection models 113*a-b* may have been trained to identify different objects of interest (e.g., the object-detection model 113*a* was trained to identify "guns" and the object-detection model 113*b* was trained to identify "sharps"). As another example, the two or more object-detection models 113*a-b* may have been trained to identify the same object of interest but were trained differently, such as by using different training image sets (e.g., the object-detection model 113*a* was trained on adversarial image data and the object-detection model 113*b* was trained on general image data) and/or training parameters, among other possibilities. As yet another example, the two or more object-detection models 113*a-b* may have been trained to identify the same object of interest but were designed by different vendors, manufacturers, or the like. As a further example, the two or more object-detection models 113*a-b* may have been trained to identify the same object of interest but have different architectures (e.g., the object-detection model 113*a* may have a YOLO architecture and the object-detection model 113*b* may have a Faster R-CNN architecture). Other example characteristics by which two models can differ are also possible.

As a result of the two or more object-detection models 113*a-b* differing in some respect, the two or more sets of object-detection conclusions that are output by the two or more object-detection models 113*a-b* may, at least at times, include one or more conclusions that differ between the two models. For example, the object-detection model 113*a*'s classification conclusion may include a label of "gun," whereas the object-detection model 113*b*'s classification conclusion may include a label of "knife." As another example, the object-detection model 113*a*'s localization conclusion may define a bounding box for an object of interest that is larger in area than the object-detection model 113*b*'s defined bounding box. Other examples are also possible. As discussed below, the object-detection system 110 is configured to resolve any such discrepancy in the sets of object-detection conclusions that are output by the two or more object-detection models 113*a-b* and/or in multiple sets of object-detection conclusions that are output by a single object-detection model.

The GPU 114 of the object-detection system 110 may include one or more graphics processing units that are individually and/or collectively configured, perhaps along with the processor 111, to train object-detection models 113*a-b* and/or execute such trained object-detection models 113*a-b*. In example implementations, the GPU 114 may take the form of a GPU that includes a plurality of parallel and pipelined single instruction, multiple data (SIMD) units that may be configured to simultaneously perform mathematical operations. Examples of such GPUs may include GPUs made by AMD, NVIDIA, Intel, etc. In some implementations, the GPU 114 may include one or more processors that are specifically designed for performing machine learning, such as one or more of Google's Tensor Processing Units (TPUs), among other examples. The GPU 114 may take various other forms as well.

The communication interface 115 may generally be configured to facilitate data communications between the object-detection system 110 and data sources (e.g., detection devices 122 in FIG. 1) and output systems (e.g., output devices 124 in FIG. 1). In example implementations, such data communications may be wireless and/or wired communications. To that end, the communication interface 115 may take any suitable form for facilitating these data communications, such as a serial bus interface (e.g., USB, FireWire, etc.), an Ethernet interface, a wireless chipset and/or antenna configured for wireless communication, and/or a proprietary wireless and/or wired communication interface, among other possibilities.

In operation, the communication interface 115 enables the object-detection system 110 to output data to a variety of recipients as a result of performing various object-detection functions. For example, as a result of the object-detection system 110 performing multi-model object detection, the object-detection system 110 may cause, via the one or more links 130, an output device 124 of a given screening system 120 to display a visualization to enable a human security screener to analyze a particular baggage item or the like.

III. Example Object-Detection Model Functions

As discussed above, each object-detection model 113*a-b* in FIG. 2 can take a variety of forms. In example embodiments, each object-detection model 113*a-b* is defined based on one or more machine-learning techniques and designed according to a particular model architecture, which can take a variety of forms. The discussion below provides two example types of object-detection models that may be used in example implementations, but numerous other types are possible as well.

Figure 3:
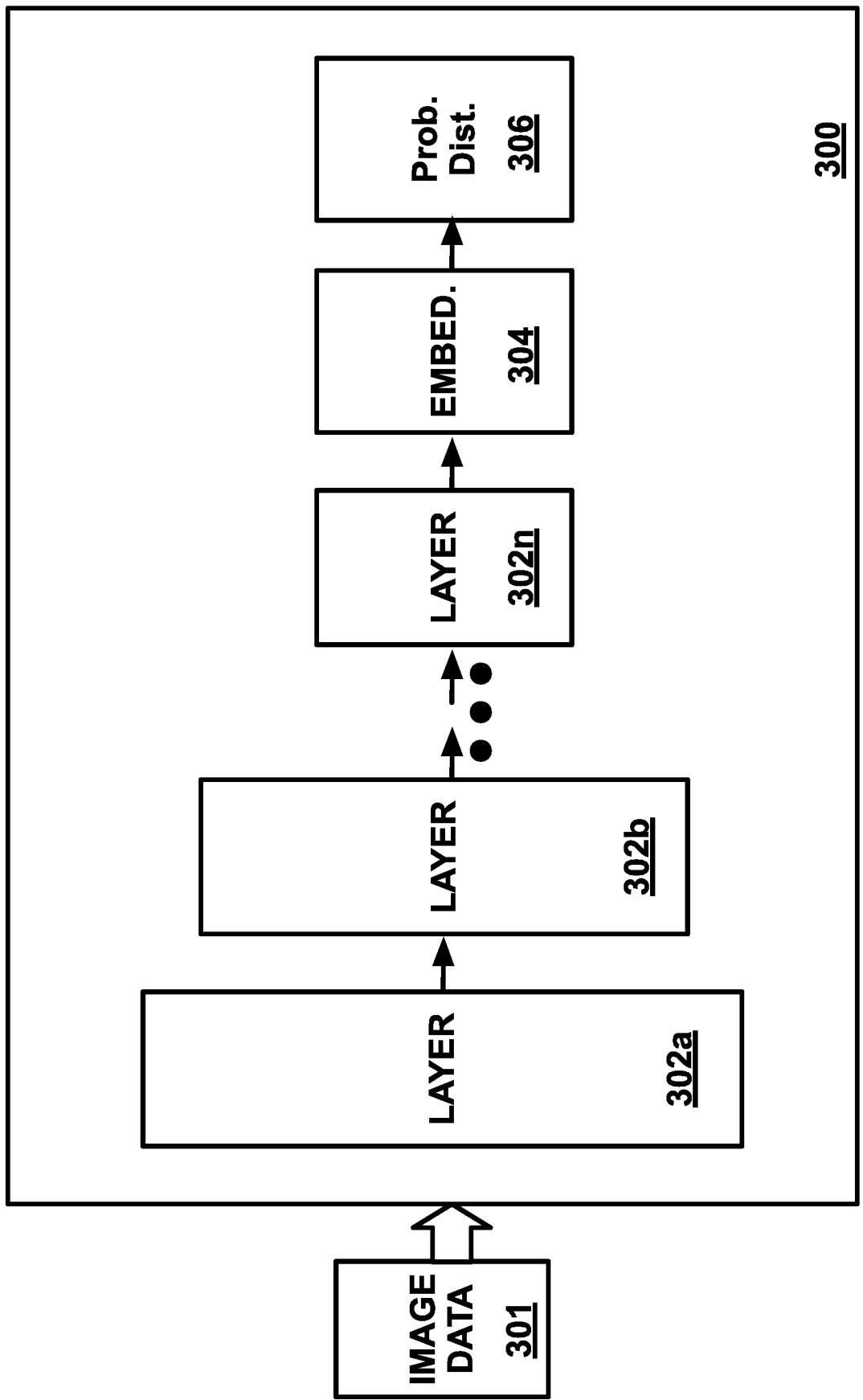
FIG. 3 provides a conceptual illustration of an example single-stage object-detection model.

FIG. 3 provides a conceptual illustration of an example single-stage object-detection model 300 that takes the form of a single-stage neural network. At a high level, the single-stage object-detection model 300 is configured to receive image data 301 as input and then localize and classify any object of interest within the image data that the single-stage object-detection model 300 was previously trained to detect.

More specifically, the single-stage object-detection model 300 includes a series of layers 302*a*-302*n* (collectively "layers" 302), each of which may take the form of a convolutional, residual, and/or pooling layer. In example implementations, some or all of the layers 302 are convolutional layers, each of which is configured to (i) receive a set of input values (e.g., an array of pixel values, a set of voxel values, etc.) that are based on the originally inputted image data 301 (e.g., for layer 302*a*, the set of input values correspond to the originally inputted image data 301; for deeper layers (302*b-n*), the set of input values correspond to the output of the preceding layer), and (ii) apply one or more "kernels" to the set of input values—where each "kernel" includes a set of weights and operates as a filter—to perform convolution across the set of input values to generate a "feature map" (also referred to as an "activation map") that provides a representation of certain features within the originally inputted image data 301 that the given layer identified.

In practice, each layer 302 may have a different associated set of one or more kernels, which may depend on the feature that a given layer 302 is trained to identify. For example, layer 302a may include a first set of one or more kernels to facilitate identifying low level features (e.g., simple edges or curves), whereas a deeper layer may include a second set of one or more kernels to facilitate identifying more complex features (e.g., knife blades or the like).

In general, each given kernel's set of weights are "learned" in a training phase during which (i) training images (also referred to as "ground truth" images) that are labeled as containing an object of a particular classification and (ii) corresponding localization descriptions for such objects (e.g., bounding boxes that identify the locations of the objects within the training images) are propagated through the single-stage object-detection model 300. The single-stage object-detection model 300 typically learns the weights for each given kernel by minimizing a function. As one example of such a function, a loss function may be utilized that either or both (i) penalizes incorrectly-classified objects and/or incorrectly positioned bounding boxes and (ii) positively reinforces correctly-classified objects and/or correctly positioned bounding boxes. Other examples of loss functions are also possible.

As mentioned above, to apply a given kernel, the single-stage object-detection model 300 performs convolution across the set of input values that are input to a given convolutional layer 302. This convolution process generally involves (i) identifying a subset of values from the set of values that are provided as input to the given layer 302 (e.g., a subset of neighboring pixel values or feature-map values), (ii) multiplying that identified subset of values by the given kernel's values (e.g., performing element-wise multiplications), (iii) summing the results of these multiplications, and (iv) repeating these steps for each subset of values from the set of values that are provided as input to the given layer 302, and thereby generating a set of summed values that is referred to as a "feature map" because the output values are indicative of, or otherwise contain information about, one or more features detected by the given layer 302. As such, some or each of the convolutional layers 302 may be considered a "feature extractor" or "feature extraction layer."

In example implementations, one or more layers of the single-stage object-detection model 300 are designed such that a feature map generated by a given convolutional layer serves as the input to a subsequent convolutional layer. In other implementations, one or more layers of the single-stage object-detection model 300 are designed such that a feature map generated by a given convolutional layer serves as the input to a classification layer.

In the case illustrated in FIG. 3, the feature map generated by the feature extraction layer 302a is the input to the subsequent feature extraction layer 302b, which in turn may apply further convolutional operations on the input feature map to generate a feature map indicative of more complex features than the feature map of layer 302a. The process of generating feature maps and passing the generated feature maps through subsequent feature extraction layers may continue through the final layer 302n.

A classification layer is generally configured to generate a probability distribution that indicates a likelihood that a particular portion of the originally inputted image 301, which is defined by a given proposed localization conclusion (e.g., a proposed bounding box), contains an object that belongs to a particular object class. In practice, a set of one or more proposed bounding boxes (e.g., "anchor boxes" or "priors") guide the search of the originally inputted image 301, such as a set of anchor boxes of respective aspect ratios (e.g., 1:1, 1:2, 2:1, and 1:3). For each spatial cell in a given feature map, the layers may be configured to output respective bounding box refinements and corresponding respective classification confidence values for the set of one or more proposed bounding boxes.

Thereafter, the single-stage object-detection model 300 may generate an embedding 304 that represents one or more features that the layers 302 detected within the originally inputted image data 301. The embedding 304 may take the form of a multi-dimensional vector, each dimension representing a given feature detected within the originally inputted image data 301. From the embedding 304, the single-stage object-detection model 300 may generate a final probability distribution 306 comprising one or more confidence values, each of which indicates a likelihood that the portion of the originally inputted image data 301 corresponding to a given bounding box comprises an object that belongs to a particular object class.

The single-stage object-detection model 300 is then capable of providing a set of object-detection conclusions regarding the given image, which may include some or all of a localization conclusion, a confidence conclusion, and a classification conclusion, among other possible conclusions. For instance, (i) the localization conclusion may correspond to a given bounding box that may be defined by one or more coordinates within the originally inputted image data 301 and/or one or more dimensions, (ii) the confidence conclusion may correspond to an output probability (e.g., from probability distribution 306) indicating a likelihood that the portion of the originally inputted image data 301 corresponding to the given bounding box comprises an object that belongs to a particular object class, and (iii) the classification conclusion may correspond to a classification label or the like that corresponds to the particular object class associated with the confidence conclusion.

Figure 4:
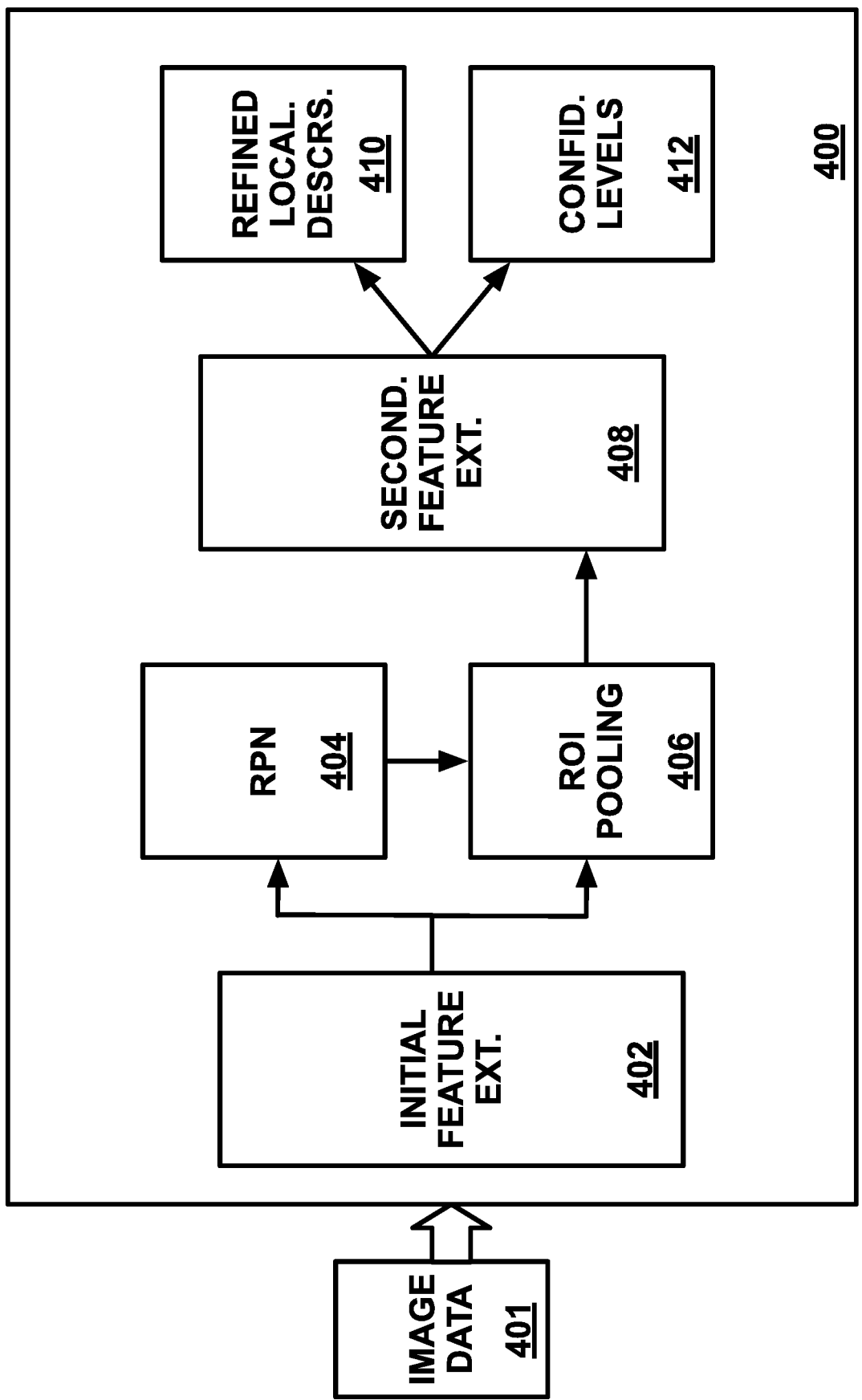
FIG. 4 provides a conceptual illustration of an example two-stage object-detection model.

Turning now to FIG. 4, a conceptual illustration is provided of an example two-stage object-detection model 400 that includes at least two neural networks. At a high level, the two-stage object-detection model 400 is conceptually similar to the example one-stage object-detection model 300 of FIG. 3 except that the two-stage object-detection model 400 includes a stage in which an additional neural network (referred to as a region proposal network (RPN)) performs functions not performed in the one-stage object-detection model 300.

More specifically, the two-stage object-detection model 400 includes a first series of layers that are configured to perform an initial stage of feature extraction. For instance, the initial stage of feature extraction 402 receives image data 401 as input, propagates the image data 401 through one or more layers that may take the form of convolutional, residual, and/or pooling layers, and outputs an initial set of one or more feature maps that are provided to an RPN 404 and a region of interest (ROI) pooling layer 406.

The RPN 404 is configured to receive the initial set of one or more feature maps and identify regions of interest within the originally inputted image data 401 that are most likely to contain an object that the RPN was trained to identify. The RPN 404 outputs one or more "region proposals" and accompanying scores, where (i) each region proposal takes the form of a proposed localization conclusion (e.g., a proposed bounding box) that identifies a potential object of interest and (ii) each accompanying score (i.e., "region proposal score") takes the form of a value that indicates a likelihood (i.e., a measure of the RPN 404's "confidence") that the proposed localization conclusion (e.g., proposed bounding box) contains an object of interest. In other words, a given region proposal score (e.g., a value between 0 and 1) may represent how well a given region of image 401 that is defined by a proposed bounding box (e.g., an anchor box) encapsulates an object of interest. In practice, these region proposal scores may be relatively agnostic to the class of object encapsulated.

After the RPN 404 identifies the one or more region proposals, it passes information regarding these one or more region proposals to subsequent layers that facilitate the two-stage object-detection model 400 performing additional feature extraction and classification on the identified one or more region proposals. For instance, the ROI pooling layer 406 takes as input (i) the information regarding the one or more region proposals and (ii) the initial set of one or more feature maps from the initial stage of feature extraction 402 and then reduces the number of region proposals to a more manageable number for further analysis by subsequent layers of the two-stage object-detection model 400.

More particularly, in example embodiments, the ROI pooling layer 406 may take some or all of the region proposals and reshape each respective region proposal into two or more fixed-size pooling sections. Thereafter, the ROI pooling layer 406 may convert (e.g., "pool") the feature-map values within each of the two or more fixed-size pooling sections (e.g., using a max-pooling function) to obtain a representative feature-map value for each of the fixed-size pooling sections, which may take the value of the maximum value within the given pooling section. In this way, the ROI pooling layer 406 functions to downsample the feature-map values from the initial stage of feature extraction 402. In example implementations, the ROI pooling layer 406 may generate an ROI vector by inputting the set of representative feature-map values into one or more fully-connected layers (not pictured).

The ROI pooling layer 406's output then passes to a "secondary" stage of feature extraction 408, which generally functions to (i) determine whether any of the fixed-size pooling sections contain an object that falls within an object classification that the secondary stage of feature extraction 408 was trained to identify and (ii) perform localization-conclusion (e.g., bounding-box) regression. In example implementations, the secondary stage of feature extraction 408 includes or otherwise takes the form of a support vector machine (SVM), softmax classifier, or another form of classifier.

In any case, the secondary stage of feature extraction 408 may generate as its output one or more (i) refined localization conclusions 410 (e.g., refined bounding boxes), each corresponding to a determination by the secondary stage of feature extraction 408 that a given localization description (e.g., a given set of dimensions and/or location of a bounding box) likely contains an object that falls within a particular object classification and (ii) corresponding confidence levels 412 (e.g., confidence conclusions), each indicating a measure of the likelihood that a given refined localization conclusion contains an object that falls within a particular object classification as opposed to merely including background imagery. Based on the one or more outputs, the object-detection model 400 may identify a respective classification label corresponding to a respective refined localization conclusion, which may form all or part of the model 400's classification conclusion. In practice, the object-detection model 400 may identify a classification label based on an index or the like, each entry of which maps to a given label such as "sharp," "knife," "gun," etc.

Additional details regarding an example object-detection model are disclosed in U.S. patent application Ser. No. 15/800,609, the contents of which are herein incorporated by reference in its entirety.

As discussed before, forms of object-detection models other than neural-network based object-detection models may be utilized. For example, one or more of the two or more object-detection models 113*a-b* may take the form of a rules-based object-detection model. In a particular example, a rules-based object-detection model may receive as input data corresponding to a scanned scene, determine from that data one or more characteristics of the scanned scene (e.g., density and/or atomic, elemental, and/or chemical structure), and output one or more object-detection conclusions based on (i) the one or more determined characteristics and (ii) one or more predefined rules that form the basis of the rules-based object-detection model. In this respect, the object-detection system 110 may define a rules-based object-detection model by identifying one or more respective values (e.g., a single value or range of values) for one or more scan characteristics that are indicative of one or more classes of objects of interest, which may then be embodied into a set of one or more rules that form the basis of the rules-based object-detection model. For instance, one possible example of a rules-based object-detection model may be configured to designate a portion of a scanned scene as an object of interest if the portion has a density that exceeds a threshold density value (e.g., the portion is deemed to be a "high-density" area) and the portion has a particular atomic structure. Other examples are also possible.

Regardless of the type and/or architecture of the object-detection models 113*a-b* in FIG. 2 utilized by the object-detection system 110, each object-detection model 113*a-b* is configured to receive data corresponding to a scanned scene (e.g., image data) as input and then output a set of object-detection conclusions based on that received data, which may include some or all of a classification conclusion, a confidence conclusion, and a localization conclusion, among other possible conclusions.

IV. Example Reconciliation Operations

As discussed before, humans have been tasked with identifying objects of interest within images of scenes, such as a security screener determining whether an image of a scanned baggage item contains any object deemed to be a security risk (e.g., a gun, knife, etc.). However, humans are generally poor at performing such sporadic visual searching, which is due at least in part to cognitive fatigue, and they often fail to identify objects of interest within images of scanned scenes, which can result in a variety of negative consequences, such as a gun finding its way onto a passenger flight, train, bus, etc.

Accordingly, computerized systems have been developed to perform object detection on behalf of a human. Indeed, recently, such computerized systems have become relatively good at performing object detection on images of "simple" scenes. However, existing computerized systems become increasingly poorer at performing object detection as images of scenes become more "complex." For example, some existing systems can accurately detect an object of interest within an image of a scanned scene that contains few objects that are arranged in a manner where there is minimal overlap. On the other hand, the accuracy of existing systems decreases as the number of objects within a scanned scene increases, the arrangement of objects becomes more congested or cluttered, and/or the number of target object-of-interest classes increases.

To help address these as well as other problems with existing object-detection systems, examples disclosed herein provide the object-detection system 110 that utilizes multiple object-detection models to detect objects of interest within images of scenes. Such a system provides a technological improvement over (i) existing systems that rely on a single model to perform object detection and (ii) existing systems that only rely on multiple models to perform the classification functions of object detection (e.g., determining a classification label and confidence level for a given object of interest), which are inherently less complex functions than object detection as a whole. In this regard, the object-detection system 110 of this disclosure may provide various technological advantages over existing systems, such as improved object-detection accuracy, improved detection rates, decreased false positives, increased number of supportable object-of-interest classes, and/or facilitating continuous system enhancement, among other advantages.

Alongside providing a technological improvement over existing object-detection systems, a multi-model object-detection system presents its own additional technological challenges that are addressed by the example object-detection system 110 disclosed herein. For instance, for a given image, each model of a multi-model object-detection system generates one or more of its own sets of object-detection conclusions about a given perceived object of interest within the given image, where each such set may include some or all of (i) a classification conclusion that includes a classification label assigned to the given perceived object of interest, (ii) a confidence conclusion that includes a confidence level of the classification of the given perceived object of interest, and (iii) a localization conclusion that includes a localization description of the given perceived object of interest within the given image (e.g., a description of the dimensions and/or location of a bounding box for the given object defined by a set of coordinates), among other possible conclusions.

In practice, a set of object-detection conclusions for a given image from a first model (e.g., the object-detection model 113a of FIG. 2) will differ, at least at times, in some respect from a set of object-detection conclusions for the given image from a second model (e.g., the object-detection model 113b of FIG. 2). Consequently, the object-detection system 110 is generally presented with the challenge of determining whether (i) there are multiple objects of interest in the given image and/or (i) the two or more competing conclusions are referring to the same object of interest within the given image. In other words, the object-detection system 110 is presented with the challenge of reconciling discrepancies in its multiple sets of object-detection conclusions in order to generate one set of conclusions for each perceived object of interest within the given image. The object-detection system 110 of this disclosure is configured to provide a technological solution to this challenge by performing one or more of the operations disclosed herein.

For purposes of illustration only, example operations that may be performed to resolve object-detection discrepancies are described in the context of the example system configuration 100 of FIG. 1, where the object-detection system 110 is configured as a multi-model object-detections system and configured to perform example reconciliation operations.

To help describe some of these operations, flow diagrams may be referenced to describe combinations of operations that may be performed. In some implementations, each flow-diagram block may represent a module or portion of program code that includes instructions that are executable by one or more processors to implement specific logical functions or steps in a process. The program code may be stored on any type of computer-readable medium, such as non-transitory computer-readable media. In other implementations, each block may represent circuitry that is wired to perform specific logical functions or steps in a process. Moreover, the blocks depicted in the flow diagrams may be rearranged into different orders, combined into fewer blocks, separated into additional blocks, and/or removed based upon the particular embodiment.

Figure 5:
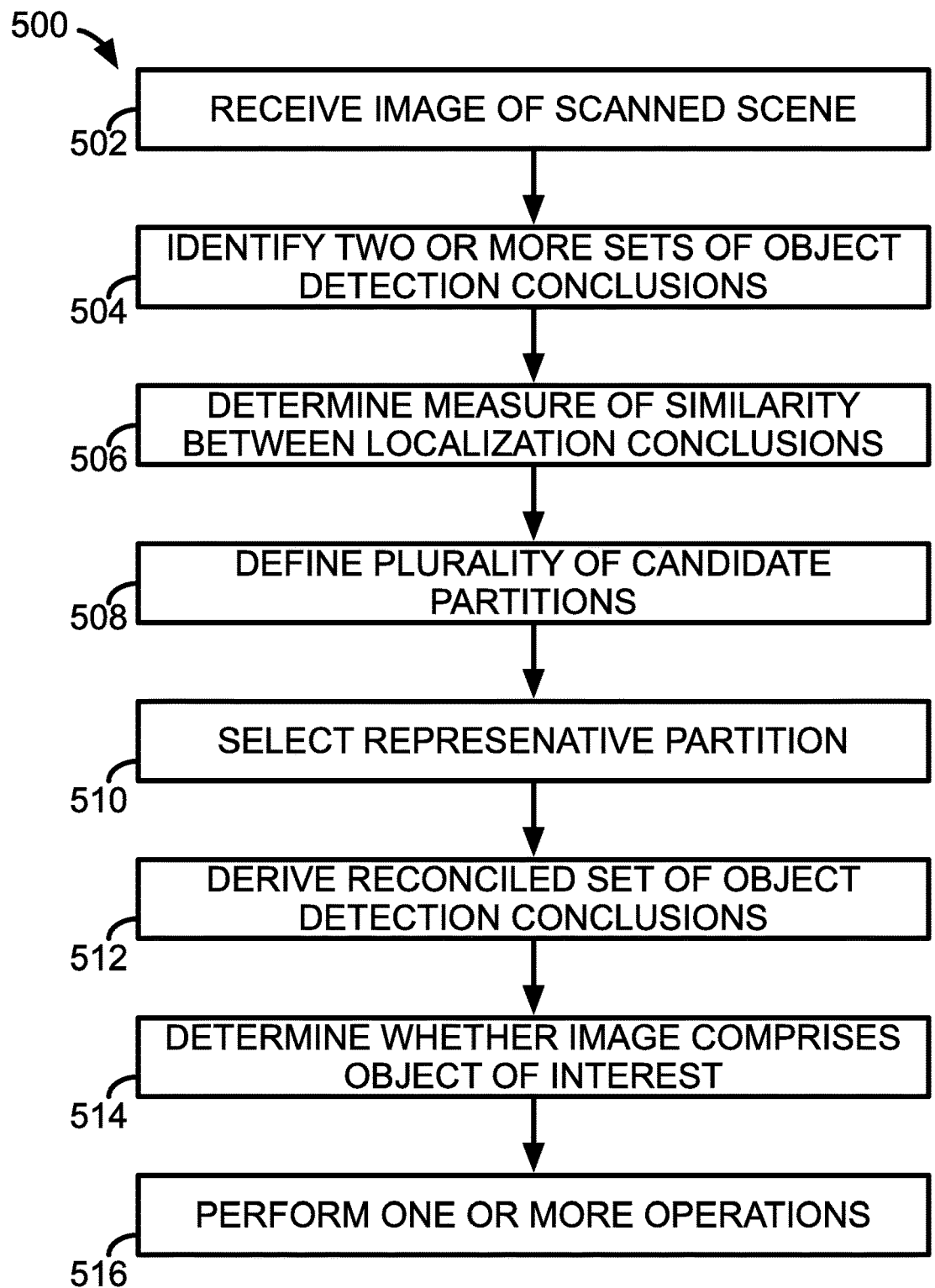
FIG. 5 provides a flowchart of an example multi-model object-detection process.

Turning now to flow diagram 500 of FIG. 5, the object-detection system 110 is configured to implement an example multi-model object-detection process that generally involves (i) at block 502, receiving an image of a scanned scene from a particular screening system, (ii) at block 504, identifying two or more sets of object-detection conclusions for the received image, (iii) at block 506, determining a measure of similarity between at least first and second localization conclusions that were determined to refer to the same object of interest within the received image, (iv) at block 508, defining a plurality of candidate partitions based on at least the first and second localization conclusions, (v) at block 510, selecting a representative partition from the plurality of candidate partitions, (vi) at block 512, deriving a reconciled set of object-detection conclusions for the object of interest, which may be based on the selected representative partition, (vii) at block 514, determining whether the received image comprises an object of interest for the particular screening system, which may be based on the reconciled set of object-detection conclusions, and (viii) at block 516, in response to at least the derivation at block 512, performing one or more operations. Each of these functions is described in further detail below.

At block 502, the object-detection system 110 receives a particular image corresponding to a scene that was scanned by one or more detection devices of a particular screening system. In example implementations, the object-detection system 110 receives the particular image in a data transmission from the screening system 120 via one or more of the links 130, which may take the form of one or more wireless and/or wired communication paths. In operation, the object-detection system 110 may receive data representing the particular image in a variety of forms, such as one of the forms discussed with reference to FIG. 1.

At block 504, the object-detection system 110 identifies two or more sets of object-detection conclusions for the received image. In example embodiments, the two or more sets of object-detection conclusions were generated by two or more object-detection models (e.g., the two or more object-detection models 113a-b of FIG. 2). In some instances, a single object-detection model (e.g., object-detection model 113a or 113b) may generate two or more sets of object-detection conclusions at a time. Other examples are also possible.

In some example embodiments, before identifying the two or more sets of object-detection conclusions for the received image, the object-detection system 110 is configured to first select two or more object-detection models (e.g., in instances in which there are more than two object-detection models) that are to generate the object-detection conclusions for the received image. In practice, the object-detection system 110 may perform this function in a variety of manners.

As one possibility, the object-detection system 110 may select the two or more object-detection models based on a variety of factors that inform the object-detection system 110 about which two or more object-detection models would be most suitable for performing object-detection for the received image, such as the vendor, manufacturer, or the like that designed the model and/or the type of training data that was used to train the model, among other factors. For example, a first object-detection model may be prioritized over another model because the designer of the first model historically creates more accurate models than the designer of the other model. As another example, a first object-detection model may be prioritized over another model because the training data used to train or otherwise update the first model is superior to the training data used to train or otherwise update the other model. Other examples are also possible.

As another possibility, the object-detection system 110 may select the two or more object-detection models based on the output of a machine-learning model (e.g., one or more neural networks) that receives as input the received image and outputs one or more indications that informs the object-detection system 110 about which two or more object-detection models would be most suitable for performing object-detection for the particular received image. For example, the one or more indications may provide an indication of one or more characteristics of the particular received image (e.g., the received image is considered to be "complex," the received image comprises high-density areas, etc.), which the object-detection system 110 may use as a basis to select two or more object-detection models that typically perform well at object detection on images containing those one or more characteristics. As another example, the one or more indications may be respective likelihoods that the object-detection models available to the object-detection system 110 will accurately perform object detection on the particular received image. Other examples are also possible. In some cases, such a machine-learning model may have been trained or otherwise updated based, at least in part, on "continuous learning" functionality that is discussed later.

In any case, after the object-detection system 110 has identified the two or more object-detection models, the object-detection system 110 may then identify one or more sets of object-detection conclusions from each of these models for the received image in a variety of manners. As one possibility, the object-detection system 110 itself comprises these two or more object-detection models and executes each of the models utilizing the received image, thereby generating the two or more sets of object-detection conclusions.

As another possibility, the object-detection system 110 may rely on one or more other systems that are communicatively coupled to the object-detection system 110 to execute some or all of the two or more object-detection models utilizing the received image and then receive the corresponding portion of the two or more sets of object-detection conclusions therefrom. In some such implementations, the object-detection system 110 may first transmit to the one or more other systems (i) the received image and (ii) an identification of some or all of the two or more object-detection models that are to analyze the received image, which then facilitates the one or more other systems generating the two or more sets of object-detection conclusions. Other possibilities also exist, such as the object-detection system 110 working collectively with another system to generate the two or more sets of object-detection conclusions.

In any event, as discussed above, each of the two or more object-detection models was trained to identify one or more objects of interest and is configured to generate one or more sets of object-detection conclusions for the received image. In this respect, at least at times, any given object-detection model may output multiple sets of object-detection conclusions for the same perceived object of interest within a given image.

Notably, the two or more object-detection models differ in at least one characteristic, such as one of the characteristics discussed with reference to FIG. 2. As a result, the two or more sets of object-detection conclusions that are output by the two or more object-detection models may include at least one conclusion that differs.

Figure 6A:
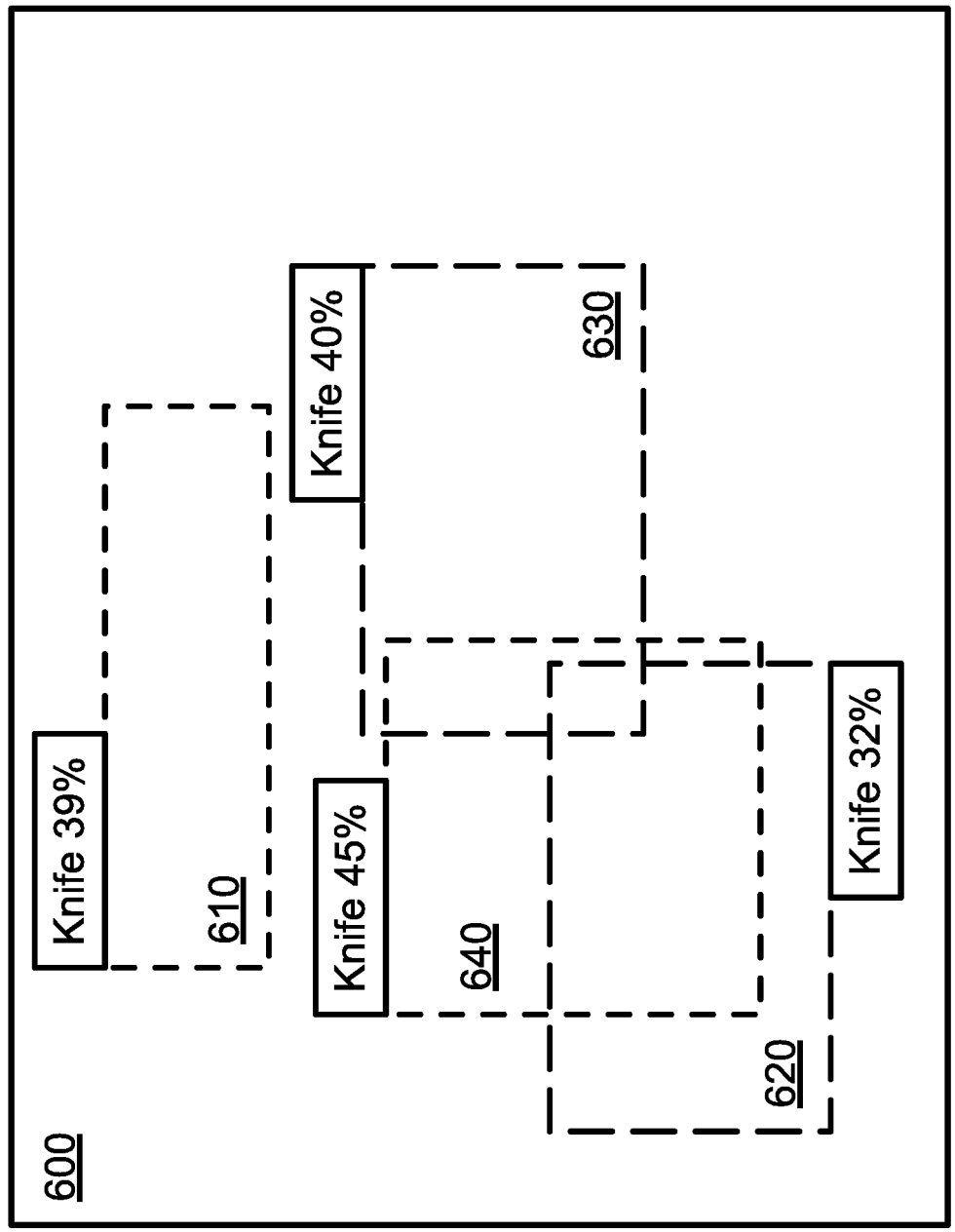
FIG. 6A provides a conceptual illustration of an example image of a scanned scene with example sets of object-detection conclusions.

To illustrate, FIG. 6A provides a conceptual illustration of an example image 600 of a scanned scene with four sets of object-detection conclusions 610, 620, 630, 640. In this example, the image 600 may be of a scanned piece of luggage passing through a TSA screening system at an airport. Here, the sets of object-detection conclusions 610 and 640 were generated by a first object-detection model (e.g., "Model A") (as indicated by the common dashed bounding boxes), while the sets of object-detection conclusions 620 and 630 were generated by a second object-detection model (e.g., "Model B") (as indicated by the common dot-dashed bounding boxes). As shown, each of the four sets of object-detection conclusions 610-640 includes the same classification conclusion (e.g., "knife"), a different localization conclusion (e.g., as indicated by the different position and dimensions of the four bounding boxes), and a different confidence conclusion (e.g., 32% versus 39% versus 40% versus 45%). In other words, while there is no discrepancy between the classification conclusions, there exist discrepancies between the localization conclusions and the confidence conclusions.

The object-detection system 110 operates to resolve discrepancies between the sets of object-detection conclusions to derive a single, reconciled set of conclusions for each perceived object of interest within the received image. In practice, the object-detection system 110 may perform such an operation in a variety of manners, an example of which is characterized by blocks 506-512 of FIG. 5.

In some implementations, the object-detection system 110 system may continue performing the reconciliation functions described below only when the two or more classification conclusions from the two or more identified sets of object-detection conclusions are the same or substantially similar. In other words, the object-detection system 110 may be configured to infer that two or more identified sets of object-detection conclusions correspond to the same perceived object of interest within the received image based on their respective classification conclusions. For example, if a first classification label is "knife" and the second classification label is also "knife," then the object-detection system 110 system may continue performing reconciliation functions. As another example, if a first and second classification label are related (e.g., a first classification label of "knife" and a second classification label of "sharps"), then the object-detection system 110 system may continue performing reconciliation functions.

On the other hand, in some implementations, when the two or more classification conclusions from the two or more identified sets of object-detection conclusions are not the same or substantially similar (e.g., a first classification label of "knife" and a second classification label of "gun"), the object-detection system 110 system may forgo continuing to perform the reconciliation functions described below and instead select the set of object-detection conclusions from the two or more identified sets of object-detection conclusions whose classification conclusion is considered to have the highest threat. For example, because objects of interest within a "gun" class are more threatening than objects of interest within a "knife" class, the set of object-detection conclusions with a classification label of "gun" would be selected as the reconciled set of object-detection conclusions. Other possibilities also exist.

At block 506, the object-detection system 110 determines a measure of similarity between at least a first localization conclusion and a second localization conclusion from the two or more identified sets of object-detection conclusions, where the first and second localization conclusions were determined to refer to the same object of interest within the received image. In practice, the object-detection system 110 may perform this function in a variety of manners.

As one possibility, the object-detection system 110 may first determine whether the two or more localization conclusions from the two or more identified sets of object-detection conclusions correspond to the same or substantially similar location within the received image. In example embodiments, this determination may involve determining whether the localization descriptions are comparable, such as by determining whether the defined bounding boxes overlap or are otherwise proximate to one another. Other manners of determining whether localization conclusions correspond to the same or substantially similar location within an image are also possible.

When two or more localization conclusions are determined to be the same or substantially similar, the object-detection system 110 may be configured to infer that these two or more conclusions correspond to the same perceived object of interest within the received image. For example, when multiple bounding boxes overlap (or are within a threshold distance from one another), the object-detection system 110 may conclude that the sets of object-detection conclusions corresponding to these bounding boxes refer to the same perceived object of interest within the received image. The object-detection system 110 may be able to infer that multiple sets of object-detection conclusions correspond to the same perceived object of interest within an image in other manners as well.

In some cases, if the object-detection system 110 determines that the localization conclusions correspond to the same or substantially similar location within the received image (e.g., the bounding boxes do overlap), then the object-detection system 110 may determine whether one of the confidence conclusions from the two or more identified sets of object-detection conclusions is above a predetermined threshold value (e.g., 60%). If so, then the object-detection system 110 may select that corresponding set of object-detection conclusions over the one or more other sets of conclusions as the single, reconciled set of object-detection conclusions. Otherwise, the object-detection system 110 may continue performing reconciliation functions. However, in some embodiments, even if the object-detection system 110 determines that one of the confidence conclusions from the two or more identified sets of object-detection conclusions is above the predetermined threshold value, the object-detection system 110 may nevertheless continue performing reconciliation functions.

In some implementations, in instances where two or more confidence conclusions are above the predetermined threshold value, the object-detection system 110 may select the set of object-detection conclusions corresponding to the highest confidence level. In other implementations, the object-detection system 110 system may continue performing reconciliation functions despite multiple confidence conclusions being above the predetermined threshold value in order to output a single, reconciled set of object-detection conclusions.

Figure 6B:
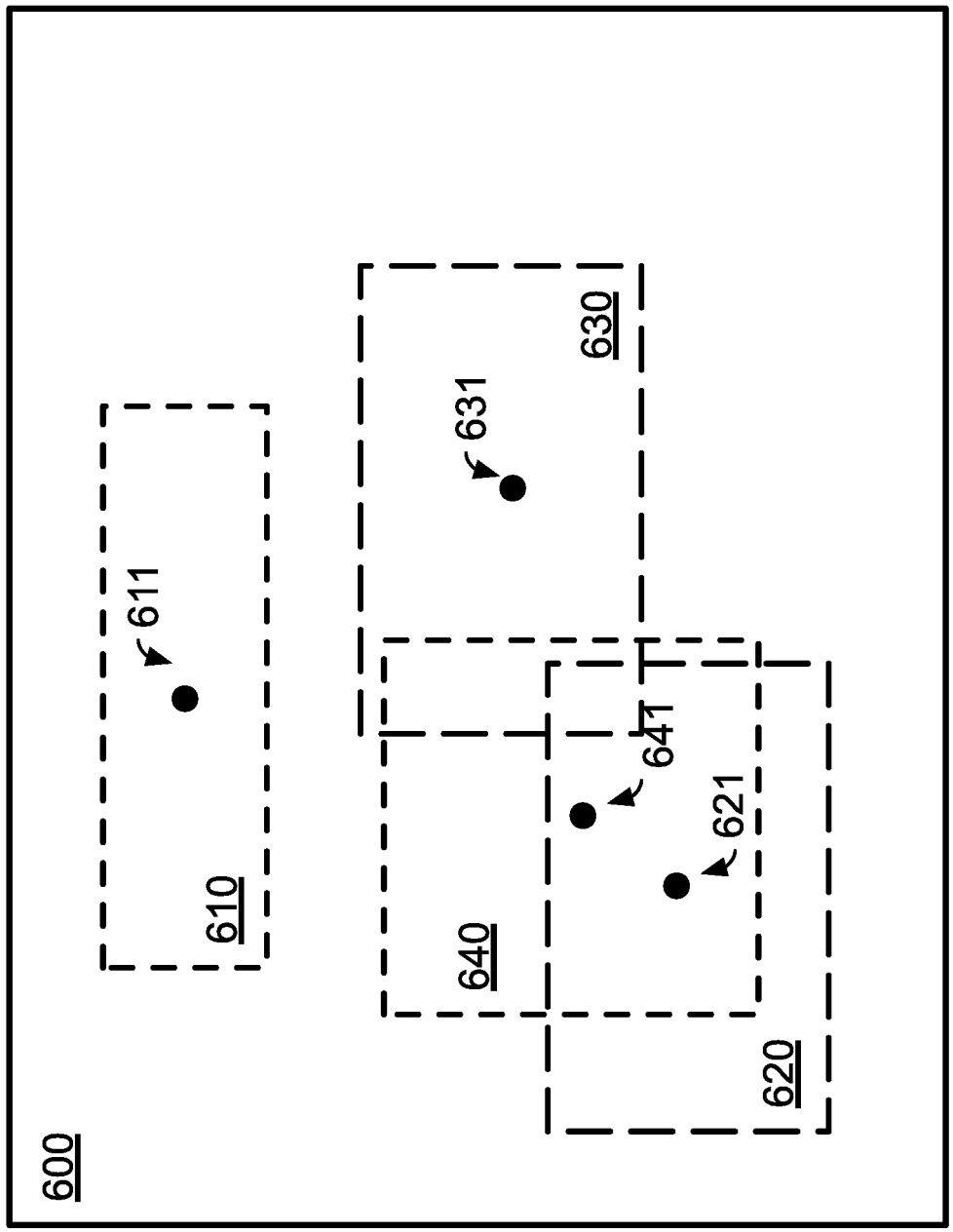
FIG. 6B provides a conceptual illustration of an example image of a scanned scene with example bounding boxes, along with an example vertex for each bounding box.

In any case, the object-detection system 110 may continue performing reconciliation functions by determining the extent of similarity between the two or more localization conclusions, which may be determined in a variety of manners. As one possibility, the object-detection system 110 may first identify a particular point (e.g., a "vertex") within each localization conclusion, such as by finding a center point within each localization conclusion's defined bounding box. To illustrate, FIG. 6B provides a conceptual illustration of the example image 600 from FIG. 6A with the four bounding boxes from the sets of object-detection conclusions, along with an example vertex 611, 621, 631, 641 for each bounding box. In the example of FIG. 6B, the vertices 611, 621, 631, 641 correspond to a center point within the four bounding boxes. For clarity, the classification labels and confidence values shown in FIG. 6A have been omitted in FIG. 6B and subsequent figures.

Figure 6C:
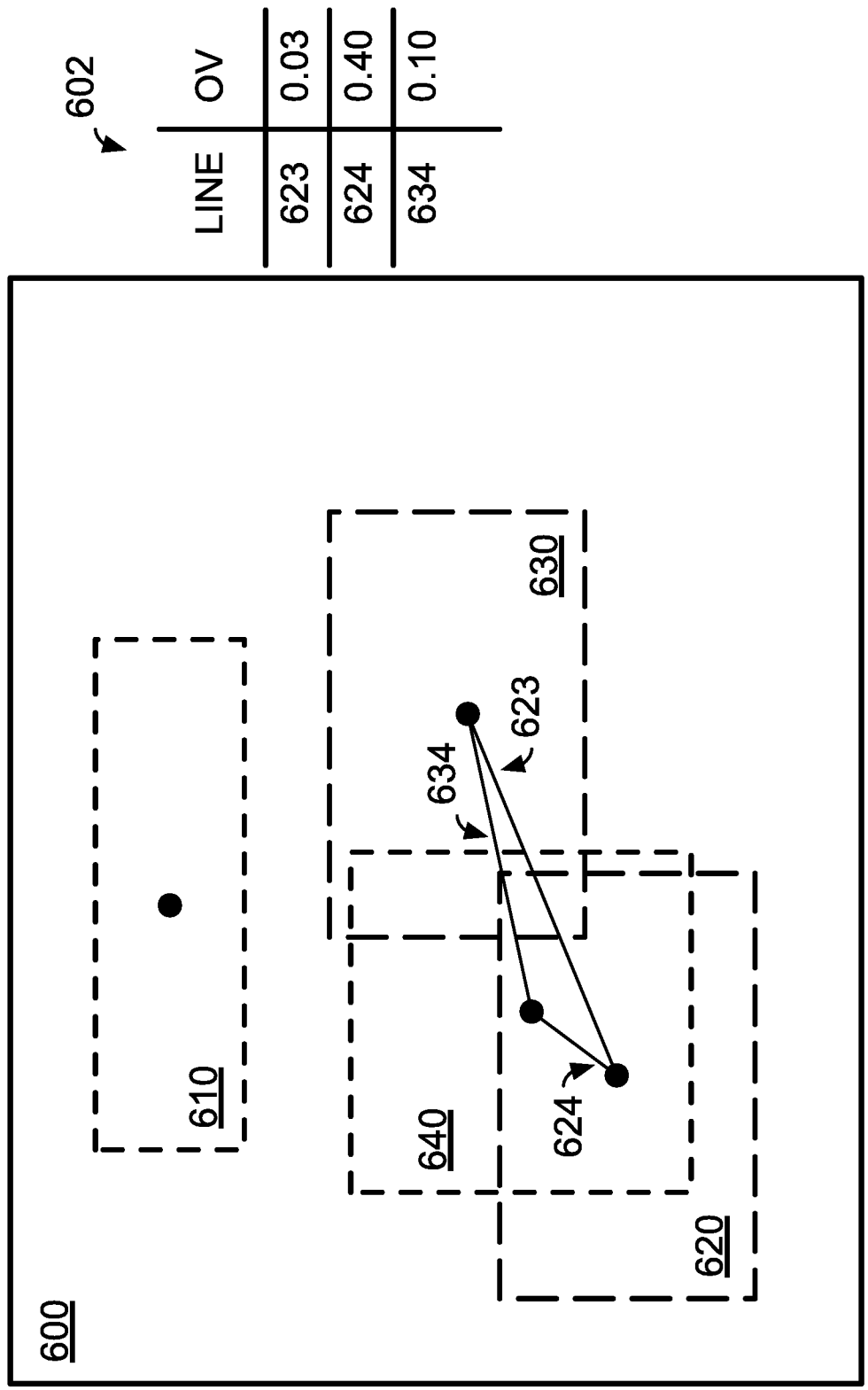
FIG. 6C provides a conceptual illustration of an example image of a scanned scene with example bounding boxes, along with example generated lines.

Next, if two localization conclusions are substantially similar (e.g., they overlap or are otherwise proximate to one another), then the object-detection system 110 may define a connection between those two localization conclusions. For example, the object-detection system 110 may generate a line (e.g., an "edge") connecting the identified vertices of the overlapping bounding boxes. To illustrate, FIG. 6C provides a conceptual illustration of the example image 600 from FIG. 6A with the four bounding boxes from the sets of object-detection conclusions, along with example generated lines 623, 624, and 634. As shown, the line 623 connects the vertex 621 for the bounding box of the set of object-detection conclusions 620 to the vertex 631 for the bounding box of the set of object-detection conclusions 630 as a result of these bounding boxes overlapping. The line 624 connects the vertex 621 for the bounding box of the set of object-detection conclusions 620 to the vertex 641 for the bounding box of the set of object-detection conclusions 640 as a result of these bounding boxes overlapping. The line 634 connects the vertex 631 for the bounding box of the set of object-detection conclusions 630 to the vertex 641 for the bounding box of the set of object-detection conclusions 640 as a result of these bounding boxes overlapping. Notably, no line connects the vertex 611 with any other vertex because the bounding box corresponding to vertex 611 is not within a threshold proximity of any other bounding boxes.

Lastly, the object-detection system 110 may then quantify the degree of similarity between the two or more localization conclusions. For example, the object-detection system 110 may assign a value to each generated line that quantifies the degree of overlap of the bounding boxes whose vertices are connected by the given generated line, such as by determining intersection over union (IoU) values for each pair of overlapping bounding boxes. In this way, the object-detection system 110 determines a measure of similarity between two or more localization conclusions from the two or more identified sets of object-detection conclusions.

To illustrate, returning to FIG. 6C, table 602 provides an overlap value (OV) for each line 623, 624, 634 that connects two bounding boxes that overlap. In this example, the overlap values (e.g., 0.03, 0.10, and 0.40) represent IoU values for each pair of overlapping bounding boxes. One of ordinary skill in the art will appreciate that the conceptual illustration shown in FIG. 6C represents an undirected graph of bidirectional edges.

Returning to FIG. 5, at block 508, the object-detection system 110 defines a plurality of candidate partitions (e.g., "cliques"), which it may do so based on at least the first and second localization conclusions. In example embodiments, each candidate partition may be defined such that the given candidate partition (i) includes no more than one localization conclusion from any particular object-detection model and (ii) maximizes the degree of similarity between the localization conclusions. The object-detection system 110 may define the candidate partitions in a variety of manners.

Figure 6D:
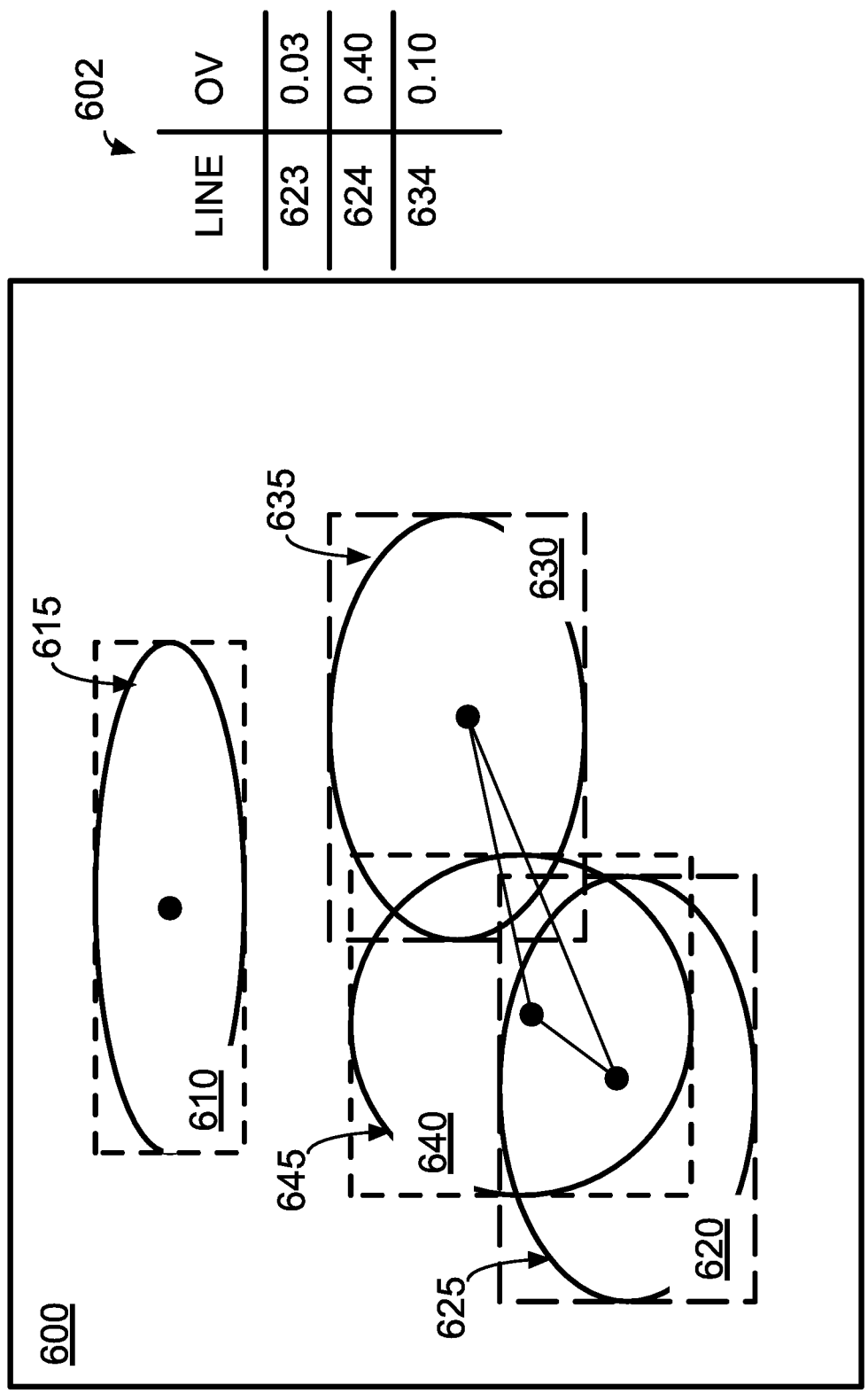
FIG. 6D provides a conceptual illustration of an example image of a scanned scene with example bounding boxes, along with example candidate partitions.

As one possible approach, the object-detection system 110 may first generate an initial candidate partition for each localization conclusion's vertex (and thus, for each bounding box). To illustrate, FIG. 6D provides a conceptual illustration of the example image 600 from FIG. 6A with the four bounding boxes from the sets of object-detection conclusions, along with example candidate partitions 615, 625, 635, 645 for each vertex.

The object-detection system 110 may then determine whether any of the initial candidate partitions should be merged, which it may do in a variety of manners. As one possibility, for each given initial candidate partition, the object-detection system 110 may determine whether the given initial candidate partition should be merged with one or more other initial candidate partitions based on the measure of similarity between localization conclusions for those partitions to thereby generate a "merged" candidate partition.

Figure 6E:
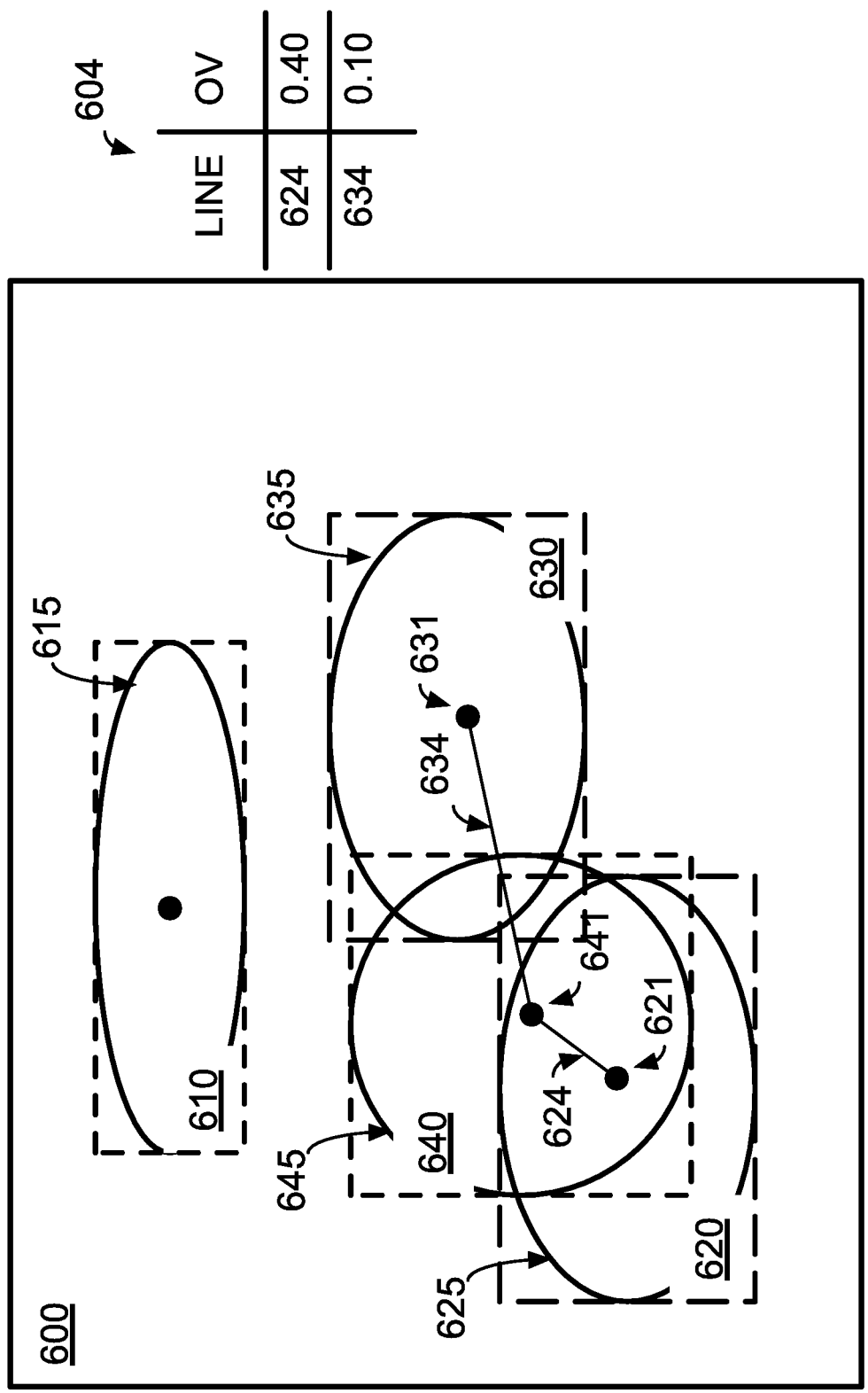
FIG. 6E provides a conceptual illustration of an example image of a scanned scene with example bounding boxes, along with identified lines for a particular candidate partition.

In one particular implementation, the object-detection system 110 may perform a merging function that involves (i) identifying any generated lines that connect a particular initial candidate partition's vertex to another vertex and (ii) excluding any identified lines that connect the given candidate partition's vertex to another vertex that corresponds to a bounding box that was defined by the same object-detection model that defined the bounding box that corresponds to the given candidate partition's vertex. To illustrate, FIG. 6E provides a conceptual illustration of the example image 600 from FIG. 6A with the four bounding boxes from the sets of object-detection conclusions, along with identified lines 624 and 634 for a particular candidate partition. Here, the particular candidate partition is partition 645 whose vertex 641 is connected by line 624 to the vertex 621 and by line 634 to vertex 631. Notably, vertices 621 and 631 correspond to an object-detection model (e.g., "Model B") that differs from the object-detection model (e.g., "Model A") corresponding to vertex 641.

Next, the object-detection system 110 may evaluate the assigned value of any remaining identified lines, which may involve identifying a merging vertex based on the remaining identified line that has the maximum assigned value (e.g., by sorting the assigned values in descending order and selecting the top value). For instance, returning to FIG. 6E, table 604 provides only the overlap values for lines 624 and 634.

Figure 6F:
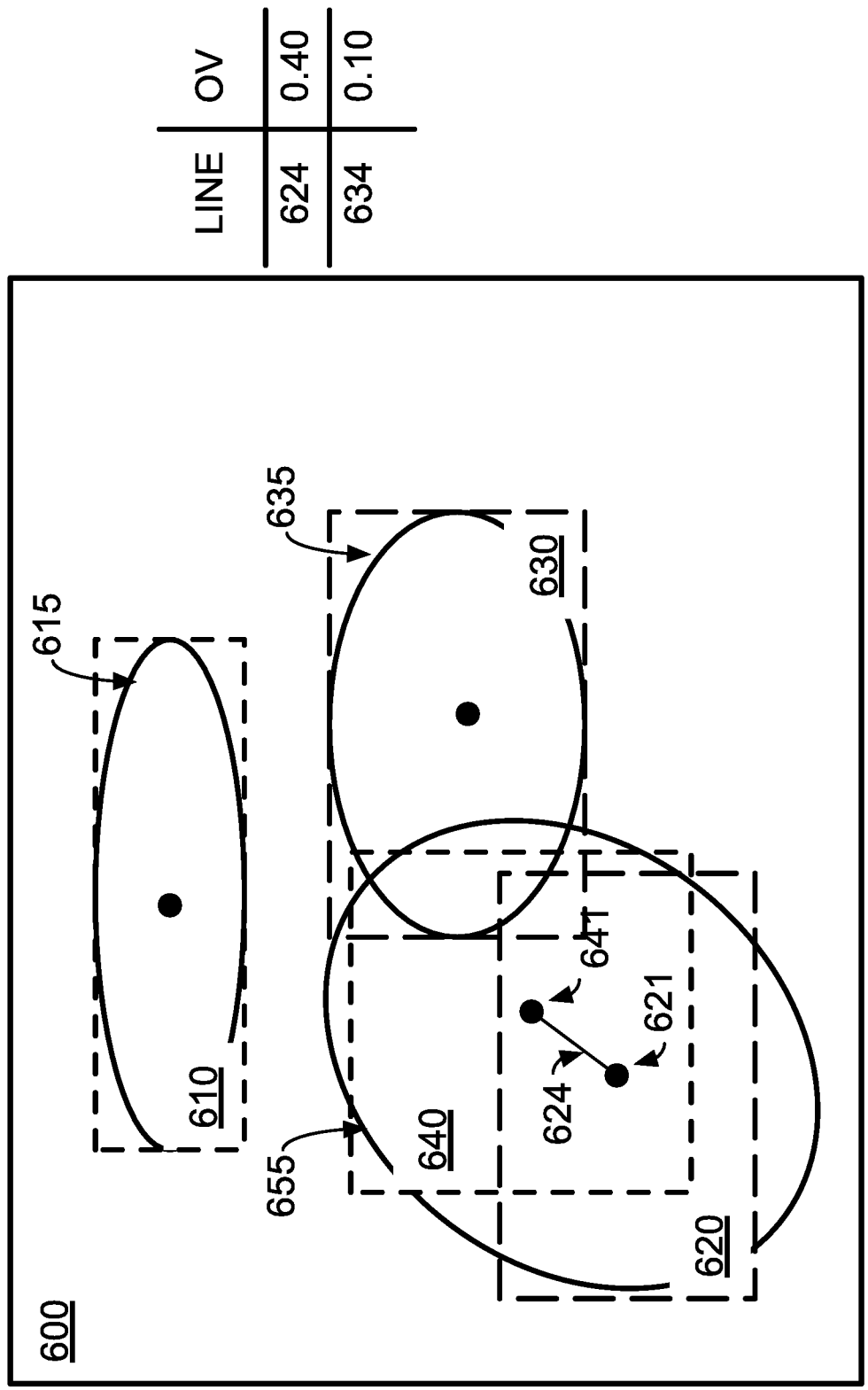
FIG. 6F provides a conceptual illustration of an example image of a scanned scene with example bounding boxes, along with a merged version of a particular candidate partition.

The object-detection system 110 may then merge the particular candidate partition with the candidate partition of the identified merging vertex, thereby defining a merged candidate partition. To illustrate, FIG. 6F provides a conceptual illustration of the example image 600 from FIG. 6A with the four bounding boxes from the sets of object-detection conclusions, along with a merged version 655 of the particular candidate partition 645 from FIG. 6E. In this example, the line 624 had the maximum assigned overlap value (making the vertex 621 the merging vertex), and so, the corresponding candidate partition 625 was merged with the particular candidate partition 645 to define the candidate partition 655.

In operation, the object-detection system 110 may perform the merging process for any remaining initial candidate partitions but with each merged candidate partition comprising its original vertex along with any merging vertices. In this way, the object-detection system 110 generates partitions that each refer to the same perceived object of interest within the received image. For the example illustrated in FIG. 6F, the object-detection system 110 may be finished with the merging process given (i) the bidirectional nature of the line 634 that connected the initial candidate partition 635 to the merged candidate partition 645 and (ii) that there is no line connecting the initial candidate partition 615 to any other candidate partition.

Returning to FIG. 5, at block 510, the object-detection system 110 selects from the plurality of candidate partitions a representative partition that informs the object-detection system 110 how to generate a single, reconciled set of object-detection conclusions for the given perceived object of interest within the received image. In practice, the object-detection system 110 may perform this function in a variety of manners.

As one possibility, the object-detection system 110 may utilize a "voting" scheme to select the representative partition in which each object-detection model provides a "vote" for a particular candidate partition that contains a vertex corresponding to that model. In example implementations that utilize a "voting" scheme, the weight (e.g., value) of a "vote" may be the same for each object-detection model (e.g., each model's "vote" has a value of one) or may differ across the object-detection models. Moreover, the weight of a given object-detection model's "vote" may be constant (i.e., predefined) or it may dynamically change over time.

In practice, the weight of a given object-detection model's "vote" may be determined (i) based on a variety of factors (e.g., the designer of the model, the type of training data that was used to train the model, the model's architecture type, etc.), (ii) based on the output of a machine-learning model (e.g., one or more neural networks) that receives as input the received image, as well as at least a portion of each model's object-detection conclusions, and outputs an indication of how each model's "vote" should be weighted, and/or (iii) based on the results of "continuous learning" functionality discussed below. Other manners of determining the weight of a "vote" are also possible.

After the object-detection system 110 applies the applicable weights to the "votes" of each object-detection model, the object-detection system 110 may then select a representative partition based on the relative weights that have been assigned to the candidate partitions. As one example, the object-detection system 110 may select the candidate partition that received a predefined threshold amount of the "votes" (e.g., 50% or more of the "votes") or the most "votes" (e.g., the most weighted partition), among other possibilities.

To illustrate, returning to FIG. 6F, the object-detection system 110 selects a representative partition from the candidate partition 615, the candidate partition 635, and the merged candidate partition 655. Utilizing a "voting" scheme in which each object-detection model's "vote" is given equal weight, the candidate partition 615 receives one "vote" from Model A, the candidate partition 635 receives one "vote" from Model B, and the merged candidate partition 655 receives a "vote" from both Models A and B. In this example, the merged candidate partition 655 is selected as the representative partition because it was weighted more than the other two candidate partitions.

At block 512 of FIG. 5, the object-detection system 110 derives a reconciled set of object-detection conclusions for the given perceived object of interest in the received image based on the sets of object-detection conclusions that correspond to the selected representative partition. In example embodiments, the object-detection system 110 deriving the reconciled set of object-detection conclusions may involve determining (i) a representative classification label, (ii) a representative (e.g., aggregate) confidence value, and/or (iii) a representative localization description of the given perceived object of interest within the received image (e.g., the dimensions and/or location of a representative bounding box of the given perceived object of interest within the received image that may be defined by a set of coordinates or the like). In practice, the object-detection system 110 may make these determinations based on the two or more original sets of object-detection conclusions that correspond to the selected representative partition (e.g., any set of object-detection conclusions whose corresponding vertex is within the selected partition).

In this respect, the object-detection system 110 may derive a representative classification label from the two or more original classification conclusions based on one or more rules. For instance, if the labels of the two or more original classification conclusions are the same, then the representative classification label is assigned that same label. However, if the two or more original classification conclusions differ, then the representative classification label may be assigned based on one or more predefined rules, which may take a variety of forms.

One possible rule may involve considering a relative threat or danger level associated with each label and may dictate that the label associated with the highest threat level is selected (e.g., between a first label of "weapon" and a second label of "sharps," the rule may dictate selecting "weapon" since it is associated with a class of objects deemed more dangerous than that associated with a "sharps" class) or a rule may dictate the opposite. Another possible rule may dictate that a more specific label (e.g., "knife") is selected over a less specific label (e.g., "sharp") or a rule may dictate the opposite (i.e., a generic label is selected over a more specific label). Other rules are also possible.

Likewise, the object-detection system 110 may derive a representative confidence value based on the two or more original confidence conclusions, such as by determining an aggregate confidence value. For example, returning to FIG. 6A, the original confidence conclusions corresponding to the selected candidate partition 655 were 0.32 from the set of object-detection conclusions 620 and 0.45 from the set of object-detection conclusions 640. These values indicate that "Model A" was 45% confident that its classification of "knife" was a true-classification and that "Model B" was 32% confident that its classification of "knife" was a true-classification. The object-detection system 110 may derive an aggregate confidence value by determining (i) the combined probability that both of these original confidence conclusions were false (i.e., that both models incorrectly classified the perceived object of interest as a "knife") by computing $(1-0.45) \times (1-0.32)$ to yield 0.374 and (ii) the combined probability that the object of interest was properly classified as a "knife" by computing $(1-0.374)$ to yield 0.626, which is set as the aggregate confidence value. Notably, while each of the original confidence conclusions (32% and 45%) was individually not high enough (e.g., at or above 60% confidence) for the object-detection system 110 to conclude that the received image contains a "knife," the representative confidence conclusion (62.6%) is high enough for the object-detection system 110 to make this determination.

Finally, the object-detection system 110 may derive a representative localization description of the given perceived object of interest within the received image based on the two or more original localization conclusions. In practice, the object-detection system 110 may perform this function in a variety of manners.

As one possibility, the object-detection system 110 may derive a representative localization description that circumscribes each of the two or more original localization conclusions. For example, the object-detection system 110 may define a bounding box that circumscribes each of the two or more original bounding boxes. As another possibility, the object-detection system 110 may derive a representative localization description by applying an aggregation function (e.g., averaging, identifying the media value, etc.) to the two or more original localization conclusions. For example, the object-detection system 110 may define a bounding box by averaging the coordinates of each of the two or more original bounding boxes. As yet another possibility, the object-detection system 110 may derive a representative localization description by selecting the localization conclusion of the two or more original localization conclusions that had the highest corresponding confidence conclusion. As yet a further possibility, the object-detection system 110 may derive a representative localization description that positions a representative bounding box at a location that is deemed the midpoint between the vertices corresponding to the two or more original localization conclusions and that defines the dimensions of the representative bounding box as the maximum (or perhaps minimum) dimensions defined by the two or more original bounding boxes. Other examples are also possible.

To illustrate, FIG. 6G provides a conceptual illustration of the example image 600 from FIG. 6A with a reconciled set of object-detection conclusions 660. In line with the above discussion, the object-detection system 110 derived a representative confidence value of approximately 63% as well as a representative bounding box that circumscribes the original bounding boxes from the set of object-detection conclusions 620 and 640.

After the object-detection system 110 derives the reconciled set of object-detection conclusions, the object-detection system 110 completes the reconciliation process for at least the given perceived object of interest in the received image. To the extent that the object-detection system 110 determines that the received image contains any additional perceived objects of interest, it will then repeat the above-discussed functions (e.g., the functions described in connection with blocks 504-512 of FIG. 5) for each additional perceived object of interest. With the reconciled set of object-detection conclusions, the object-detection system 110 may then complete its multi-model object detection on the received image, which generally involves concluding from the reconciled set of object-detection conclusions that the received image contains at least the given perceived object of interest.

In some implementations, at block 514 of FIG. 5, the object-detection system 110 may optionally determine, based on the reconciled set of object-detection conclusions, whether the received image comprises an object of interest for the particular screening system that provided the original image of the scanned scene. In other words, the object-detection system 110 may function to perform particularized object detection on the received image for the particular screening system based on the reconciled set of object-detection conclusions.

For instance, in example implementations, one or more screening systems that are in communication with the object-detection system 110 may have particular object-detection requirements, such as a particular set of objects of interest and/or particular criteria for flagging such objects of interest (e.g., minimum confidence levels, etc.). Moreover, in some cases, a screening systems' object-detection requirements may dynamically change, which may depend on the time of year, a current security-threat level, etc.

In any event, the object-detection system 110 may evaluate the reconciled set of object-detection conclusions and a particular screening system's particular object-detection requirements to determine whether the received image comprises an object that satisfies the particular object-detection requirements such that the object-detection system 110 should identify it as an object of interest for the particular screening system. Other possibilities also exist.

At block 516, the object-detection system 110 performs one or more operations based on one or both of (i) the reconciled set of object-detection conclusions and (ii) the optional determination from block 514. These one or more operations can take a variety of forms.

As one possibility, the object-detection system 110 may present one or more indications of one or more conclusions from the reconciled set of object-detection conclusions at a computer display or the like. For example, the object-detection system 110 may cause, via one or more of the links 130, an output device 124 to display a graphical visualization of a classification label for the given perceived object of interest, a graphical visualization of a confidence level for the given perceived object of interest's classification, and/or a graphical visualization of a representative bounding box for the given perceived object of interest, so that a security screener can visualize the object-detection system 110's analysis. In some instances, such graphical visualizations may be presented overlaid (or along with) a visualization of the scene that was scanned, such as a visualization of a baggage item that was scanned.

Similarly, the object-detection system 110 may, based on one or more conclusions from the reconciled set of object-detection conclusions, present at a computer display or the like one or more notifications related to the scene that was originally scanned. For example, the object-detection system 110 may cause, via the one or more links 130, an output device 124 to show a visualization for a baggage item only when the object-detection system 110 determines, based on the reconciled set of object-detection conclusions, that an object of interest within the baggage item is deemed to be a security interest for the particular screening system 120. Otherwise, the object-detection system 110 may forego causing the output device 124 to show any visualization for a scanned baggage item.

As another possibility, the object-detection system 110 may, based on one or more conclusions from the reconciled set of object-detection conclusions, cause a notification or the like to be provided to a particular output device (e.g., a wearable computing device, mobile phone, etc.) that is associated with the particular screening system 120 that provided the original scanned image, such as a text-message or app notification to a computing device assigned to a baggage handler at a security checkpoint. For example, when the object-detection system 110 determines, based on the reconciled set of object-detection conclusions, that an object of interest within a scanned baggage item is deemed to be a security interest for the particular screening system 120, the object-detection system 110 may transmit a notification to a particular output device 124, which may prompt a baggage handler to physically search the baggage item.

As yet another possibility, the object-detection system 110 may, based on one or more conclusions from the reconciled set of object-detection conclusions, cause a particular operation to occur at a screening system, such as by the object-detection system 110 transmitting, via the one or more links 130, a particular instruction indicative of the operation to the screening system 120, such as a particular pass-through operation.

For instance, the screening system 120 may include a conveyor belt on which a baggage item (or the like) moves past one or more detection devices 122, which then capture one or more images of the baggage item. A security-screener workstation at the screening system 120 includes a user interface (e.g., a button or the like) that controls the conveyor belt such that the human security screener manually controls the flow of baggage items through the system. By default, the conveyor belt only moves, and thus baggage items only pass through the system, when the security screener provides an input to engage the conveyor belt's movement. When such an input is provided by the security screener, the baggage item (i) passes by the one or more detection devices 122 that capture one or more images of the baggage item and (ii) proceeds to a "main" lane where the baggage item's owner retrieves the item. On the other hand, when the security screener identifies a potential security interest in a scanned image of the baggage item, depending on the nature and/or sophistication of the screening system 120, the security screener typically either (i) stops the conveyor belt (or otherwise declines to pass the baggage item through the "main" lane) and manually moves the baggage item to a "search" lane where a baggage handler retrieves the baggage item and searches through the contents of the baggage item or (ii) provides an input at a user interface (e.g., a user interface at a workstation at the screening system 120 that is equipped with "smart" lane technology) that diverts the baggage item to a secondary conveyor belt where a baggage handler retrieves the baggage item and searches through its contents.

In example embodiments, the object-detection system 110 causing an operation to occur at a screening system based on the reconciled set of object-detection conclusions for a received image of a baggage item may involve causing the screening system 120 to automatically cause the baggage item to no longer proceed to the "main" lane and instead proceed to the "search" lane, such as by causing an actuator or the like within screening system's conveyor-belt system to automatically divert the baggage item out of the "main" lane or by causing the baggage item to be diverted to a secondary conveyor belt (e.g., when the screening system 120 is configured with "smart" lane technology). In this way, the object-detection system 110 may promote high throughput at screening systems along with improved object-detection accuracy and may also help reduce the number of human operators that are required at a given screening checkpoint.

Likewise, the object-detection system 110 causing an operation to occur at a screening system based on the reconciled set of object-detection conclusions for a received image of a baggage item may involve causing the screening system 120 to automatically start or stop the conveyor belt without requiring control inputs from the human security screener. For instance, when the reconciled set of object-detection conclusions indicates that no object of interest is present within the baggage item (or a determination is made that no object of interest that is deemed a security interest is present within the baggage item), the object-detection system 110 may cause the conveyor belt to automatically start (or continue moving), thereby overriding the screening system's default settings and passing the baggage item through the system to the "main" lane for retrieval by the baggage item's owner. On the other hand, in some security systems that, by default, have a conveyor belt that continuously moves passing baggage items through until the system receives a "stop" input from a human screener, the object-detection system 110 may cause the conveyor belt to automatically stop when the reconciled set of object-detection conclusions indicates that an object of interest that is deemed to be a security interest is present within the baggage item, thereby overriding the screening system's default settings.

Notably, in instances where the object-detection system 110 is configured to stop the conveyor belt, the object-detection system 110 may also configure the screening system 120 such that the human security screener's ability to cause the conveyor belt to continue moving may be deactivated until an additional event occurs (other than the system receiving an input at the user interface that starts/stop the conveyor belt), such as the security screener providing an input indicating that the object-detection system 110's object detection has been acknowledged, the security screener or his/her supervisor providing certain credentials or the like at the screening system 120, etc.

Relatedly, in some embodiments, the object-detection system 110 may be configured to (i) perform object detection by applying at least one object-detection model to a given received image to obtain a set of object-detection conclusions and (ii) treat an operator's response (as indicated by feedback data) to the system's object detection as a (potentially conflicting) second set of object-detection conclusions. Depending on the object-detection system 110's object detection, the object-detection system 110 may then be capable of overriding the operator's response and/or cause a notification to be output at the screening system 120. For instance, a security screener at the screening system 120 may be compromised such that the security screener intentionally allows baggage items containing prohibited objects (e.g., guns, etc.) to pass through the screening system 120. The object-detection system 110 may be configured such that, when the object-detection system 110's object detection has a high confidence that a baggage item contains a security threat and the object-detection system 110 receives an indication (e.g., via feedback data) that the security screener has not stopped or otherwise diverted the baggage item for further inspection, the object-detection system 110 may (i) automatically divert a baggage item, (ii) stop the screening system 120's conveyor belt, (iii) sound an alarm at the screening system 120, and/or (iii) alert the security screener's supervisor, among other possibilities.

As suggested above, in example embodiments, the object-detection system 110 may be configured to receive feedback data, via the one or more links 130, based on actions that occur at the screening system 120, such as after an indication of the object-detection system 110's multi-model object detection was output. For example, an operator at the screening system 120 may provide an input at a workstation or the like that (i) provides an indication of whether the multi-model object detection was correct or not (either in whole or in part), (ii) provides an indication that the object-detection system 110 failed to detect an object of interest within an image that an operator detected, or (iii) provides an indication of an operator's classification of an object within an image (e.g., a human-entered label for an object that may or may not be deemed a security interest), among other possibilities. In practice, such inputs may take the form of direct feedback on the object-detection system 110's multi-model object detection (e.g., by an operator viewing a visual representation of the multi-model object detection on an output device 124 and then using a GUI or the like to "x-out" incorrect detections or a baggage handler providing an input at an output device 124 confirming or refuting that a baggage item contained a security threat), and/or such inputs may take the form of indirect feedback (e.g., conveyor belt actions taken by the screening operator, etc.).

Based on feedback data from actions that occurred at the screening system 120, the object-detection system 110 may be configured to update the multi-model object-detection process in a variety of manners. For instance, the feedback data may result in new or updated labeled training data that can be used to update some or all of the object-detection system 110's two or more object-detection models, such as by back-propagation when feedback data indicates that the object-detection system 110 incorrectly identified an image as containing an object of interest. For example, the feedback data may indicate that operators at the particular screening system 120 have been frequently flagging lighters within scanned images as being security threats, which the object-detection system 110's two or more object-detection models were not previously trained to detect. Based on such feedback data, the object-detection system 110 may train one or more object-detection models to detect lighters for future analysis of scanned images from the particular screening system 120.

As another case, the feedback data may result in modifying one or more of the object-detection system 110's object-detection confidence thresholds. For example, the feedback data may indicate that there are relatively frequent false alarms on "sharps," such as rolls of coins within scanned images being flagged by the object-detection system 110 as "sharps." Based on such feedback data, the object-detection system 110 may increase a confidence threshold for its "sharps" detection, such as by changing one or more confidence thresholds of at least one object-detection model that was trained to classify "sharps," and perhaps re-train one or more such models using the incorrectly flagged images. Other examples are also possible.

Moreover, updating the multi-model object-detection process may occur "on the fly" (e.g., after each image is processed and an applicable output is provided to a screening operator) or the updating may occur periodically (or as a "batch), such as every 24 hours, every week, etc., among other possibilities.

There are various other operations that the object-detection system 110 may perform based, at least in part, on the reconciled set of object-detection conclusions.

V. Example Continuous Learning Operations

As mentioned before, in example embodiments, the object-detection system 110 may be configured to perform "continuous learning," which generally involves the object-detection system 110 receiving feedback data regarding the performance of one or more of its two or more object-detection models and then updating an aspect of the multi-model object-detection process based on the feedback data. In practice, such feedback data may be a result of the multi-model object-detection process itself and/or may be received as a result of human actions with respect the object-detection system 110's multi-model object detections, as discussed above. In any case, the object-detection system 110 may perform "continuous learning" in a variety of manners.

In one respect, the object-detection system 110 may be configured to evaluate a given object-detection model's performance over time and based on the evaluation, select the given object-detection model in the first instance for multi-model object detection (e.g., as part of block 504 of FIG. 5) and/or modify the weight of the given object-detection model's "vote" (e.g., as part of block 510 of FIG. 5). For instance, the object-detection system 110 may determine that conclusions from a first object-detection model have been deemed correct more than a first threshold amount of times (e.g., the object-detection system 110 historically selects a partition that includes a vertex corresponding to the first object-detection model), and as a result, the object-detection system 110 may select the given object-detection model in the first instance for multi-model object detection and/or increase the weight of the first object-detection model's "votes."

On the other hand, the object-detection system 110 may determine that conclusions from a second object-detection model have been deemed correct less than the first threshold amount of times (and perhaps less than a second, lower threshold amount), and as a result, the object-detection system 110 may decline to select the second object-detection model for multi-model object detection, decrease the weight of the second object-detection model's "votes," or otherwise suppress the second object-detection model's object-detection conclusion. In other words, based on the object-detection system 110 evaluating a given object-detection model's performance over time, the object-detection system 110 may suppress the given object-detection model when that evaluation indicates that the model has consistently been inaccurate.

In another respect, the object-detection system 110 may be configured to evaluate a given object-detection model's performance over time and based on the evaluation, modify whether the given object-detection model should be combined with certain other object-detection models. For example, the object-detection system 110 may determine that a first object-detection model's detection of a first class of objects (e.g., "liquids") has been deemed correct more than a threshold amount of times, and a second object-detection model's detection of a second class of objects (e.g., "sharps") has been deemed correct more than a threshold amount of times. As a result, given that these models are both individually good at detecting different classes of objects, the object-detection system 110 may modify its multi-model object-detection process such that the first and second object-detection models are not used together or that such a combination is demoted in priority among other combinations. As another example, the object-detection system 110 may determine that a first object-detection model's detection within images from a first perspective of a scene (e.g., "side view" images) historically matches a second object-detection model's detection within images from a second, different perspective of the scene (e.g., "top view" images). As a result, the object-detection system 110 may modify its multi-model object-detection process such that the first and second object-detection models are used together in a manner such that the first object-detection model evaluates "side view" images of scenes and the second object-detection model evaluates "top view" images of scenes.

In yet another respect, the object-detection system 110 may be configured to not only consider feedback data for a given object-detection model's performance, but also additional data related to the given object-detection model's object detections (e.g., the image data used in the object detection, external contextual data related to the scene that was scanned, etc.), and based on such an evaluation, update an aspect of the multi-model object-detection process. For example, the object-detection system 110 may determine that a first object-detection model is historically most accurate when evaluating "complex" images (e.g., images of scenes that are cluttered) or when evaluating images with high-density areas (e.g., images of scenes with highly dense materials), and as a result, the object-detection system 110 may select the first object-detection model in the first instance for multi-model object detection and/or increase the weight of the first object-detection model's "votes" when the given image has such features. As another example, the object-detection system 110 may determine that a first object-detection model is historically most accurate when analyzing images that were scanned at certain times of year at a particular geographical location (e.g., because of the types of objects typically present in baggage items at that the time of year, such as summer, at the particular location where the scans occurred), and as a result, the object-detection system 110 may select the first object-detection model in the first instance and/or increase the weight of the first object-detection model's "votes" when external contextual data (e.g., time-of-year and geo-location data) indicates that such conditions are present at the location of the detection devices from which images are received. Other examples are also possible.

In some or all of the above examples of "continuous learning," the object-detection system 110 may be configured to utilize one or more machine-learning models (e.g., one or more neural networks) that are trained or otherwise updated based on at least feedback data indicative of the respective performance of the object-detection system 110's two or more object-detection models and perhaps other data related to scanned scenes whose image data the two or more object-detection models have analyzed (e.g., contextual data). These one or more machine-learning models may be configured to receive as input image data, and perhaps other data related to scanned scenes (e.g., contextual data), and then output (i) an indication that informs the object-detection system 110's decision of what particular object-detection models would be most accurate for the given situation and/or (ii) an indication that informs the object-detection system 110 about how much weight a given object-detection model's "vote" should be assigned (e.g., as part of block 510 of FIG. 5) for the given situation. Other possibilities also exist.

VI. Conclusion

Example embodiments of the disclosed innovations have been described above. Those skilled in the art will understand, however, that changes and modifications may be made to the embodiments described without departing from the true scope and spirit of the present invention, which will be defined by the claims.

Additionally, references herein to "embodiment" mean that a particular feature, structure, and/or characteristic described in connection with the embodiment can be included in at least one example embodiment of an invention. The appearance of this phrase in various places in the specification are not necessarily all referring to the same embodiment, nor are separate or alternative embodiments mutually exclusive of other embodiments. As such, the embodiments described herein, explicitly and implicitly understood by one of ordinary skill in the art, can be combined with other embodiments.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
    at least one processor;
    a non-transitory computer-readable medium; and
    program instructions stored on the non-transitory computer-readable medium that are executable by the at least one processor to cause the computing system to:
        receive an image of a scene that was scanned by a detection device of a screening system, wherein the image comprises an object of interest;
        identify at least a first set of object-detection conclusions for the image generated by a first object-detection model and a second set of object-detection conclusions for the image generated by a second object-detection model, wherein at least one conclusion discrepancy exists between the first and second set of object-detection conclusions;
        resolve the at least one conclusion discrepancy by:
            determining a measure of similarity between a first localization conclusion from the first set of object-detection conclusions and a second localization conclusion from the second set of object-detection conclusions, wherein the first and second localization conclusions were both determined to refer to the object of interest;
            defining a plurality of candidate partitions, wherein at least one candidate partition of the plurality of candidate partitions is defined based on the measure of similarity between the first and second localization conclusions; and
            based on a weight assigned to the at least one candidate partition, deriving a reconciled set of object-detection conclusions for the object of interest from the first and second set of object-detection conclusions, thereby resolving the at least one conclusion discrepancy; and
        based on the reconciled set of object-detection conclusions, determine that the image of the scene comprises the object of interest.

2. The computing system of claim 1, wherein the first set of object-detection conclusions comprises (i) a first classification label assigned to the object of interest, (ii) a first confidence level of a first classification of the object of interest, and (iii) a first localization description of the object of interest within the image, and wherein the second set of object-detection conclusions comprises (i) a second classification label assigned to the object of interest, (ii) a second confidence level of a second classification of the object of interest, and (iii) a second localization description of the object of interest within the image.

3. The computing system of claim 1, wherein the program instructions that are executable by the at least one processor further comprise program instructions that are executable by the at least one processor to cause the computing system to:
    before identifying the at least first and second set of object-detection conclusions, select from three or more available object-detection models the first and second object-detection models that are to generate object-detection conclusions for the image based on one or more of (i) a respective designer of the first and second object-detection models or (ii) a type of training data used to respectively train the first and second object-detection models.

4. The computing system of claim 1, wherein the first localization conclusion from the first set of object-detection conclusions comprises a first bounding box for the object of interest, wherein the second localization conclusion from the second set of object-detection conclusions comprises a second bounding box for the object of interest, and wherein determining the measure of similarity between the first localization conclusion from the first set of object-detection conclusions and the second localization conclusion from the second set of object-detection conclusions comprises determining a measure of overlap between the first and second bounding boxes.

5. The computing system of claim 1, wherein defining the plurality of candidate partitions comprises:
    defining a first candidate partition from the first localization conclusion and a second candidate partition from the second localization conclusion; and
    defining the at least one candidate partition by merging the first candidate partition with the second candidate partition based on the measure of similarity between the first and second localization conclusions.

6. The computing system of claim 1, wherein deriving the reconciled set of object-detection conclusions for the object of interest from the first and second set of object-detection conclusions comprises:
    assigning a weight to each of the candidate partitions of the plurality of candidate partitions, wherein the weight assigned to a given candidate partition is based on one or more object-detection models that correspond to the given candidate partition, and wherein the weight assigned to the at least one candidate partition is based on (i) a first weight assigned to the first object-detection model and (ii) a second weight assigned to the second object-detection model.

7. The computing system of claim 6, wherein the program instructions that are executable by the at least one processor further comprise program instructions that are executable by the at least one processor to cause the computing system to:
    based on deriving the reconciled set of object-detection conclusions for the object of interest from the first and second set of object-detection conclusions, modifying (i) the first weight assigned to the first object-detection model and (ii) the second weight assigned to the second object-detection model.

8. The computing system of claim 1, wherein the program instructions that are executable by the at least one processor to cause the computing system to determine that the image of the scene comprises the object of interest comprise program instructions that are executable by the at least one processor to cause the computing system to:
    based on the reconciled set of object-detection conclusions and one or more particular object-detection requirements for the screening system, determine that the image of the scene comprises an object of interest for the screening system.

9. The computing system of claim 1, wherein the program instructions that are executable by the at least one processor further comprise program instructions that are executable by the at least one processor to cause the computing system to:

based on determining that the image of the scene comprises the object of interest, cause at least one of (i) a display screen associated with the screening system to display a visualization related to the reconciled set of object-detection conclusions or (ii) a pass-through operation to occur at the screening system.

10. A tangible, non-transitory computer-readable medium comprising program instructions stored thereon that are executable by at least one processor to cause a computing system to:
receive an image of a scene that was scanned by a detection device of a screening system, wherein the image comprises an object of interest;
identify at least a first set of object-detection conclusions for the image generated by a first object-detection model and a second set of object-detection conclusions for the image generated by a second object-detection model, wherein at least one conclusion discrepancy exists between the first and second set of object-detection conclusions;
resolve the at least one conclusion discrepancy by:
determining a measure of similarity between a first localization conclusion from the first set of object-detection conclusions and a second localization conclusion from the second set of object-detection conclusions, wherein the first and second localization conclusions were both determined to refer to the object of interest;
defining a plurality of candidate partitions, wherein at least one candidate partition of the plurality of candidate partitions is defined based on the measure of similarity between the first and second localization conclusions; and
based on a weight assigned to the at least one candidate partition, deriving a reconciled set of object-detection conclusions for the object of interest from the first and second set of object-detection conclusions, thereby resolving the at least one conclusion discrepancy; and
based on the reconciled set of object-detection conclusions, determine that the image of the scene comprises the object of interest.

11. The non-transitory computer-readable medium of claim 10, wherein the first set of object-detection conclusions comprises (i) a first classification label assigned to the object of interest, (ii) a first confidence level of a first classification of the object of interest, and (iii) a first localization description of the object of interest within the image, and wherein the second set of object-detection conclusions comprises (i) a second classification label assigned to the object of interest, (ii) a second confidence level of a second classification of the object of interest, and (iii) a second localization description of the object of interest within the image.

12. The non-transitory computer-readable medium of claim 10, wherein the program instructions that are executable by the at least one processor further comprise program instructions that are executable by the at least one processor to cause the computing system to:
before identifying the at least first and second set of object-detection conclusions, select from three or more available object-detection models the first and second object-detection models that are to generate object-detection conclusions for the image based on one or more of (i) a respective designer of the first and second object-detection models or (ii) a type of training data used to respectively train the first and second object-detection models.

13. The non-transitory computer-readable medium of claim 10, wherein the first localization conclusion from the first set of object-detection conclusions comprises a first bounding box for the object of interest, wherein the second localization conclusion from the second set of object-detection conclusions comprises a second bounding box for the object of interest, and wherein determining the measure of similarity between the first localization conclusion from the first set of object-detection conclusions and the second localization conclusion from the second set of object-detection conclusions comprises determining a measure of overlap between the first and second bounding boxes.

14. The non-transitory computer-readable medium of claim 10, wherein defining the plurality of candidate partitions comprises:
defining a first candidate partition from the first localization conclusion and a second candidate partition from the second localization conclusion; and
defining the at least one candidate partition by merging the first candidate partition with the second candidate partition based on the measure of similarity between the first and second localization conclusions.

15. The non-transitory computer-readable medium of claim 10, wherein deriving the reconciled set of object-detection conclusions for the object of interest from the first and second set of object-detection conclusions comprises:
assigning a weight to each of the candidate partitions of the plurality of candidate partitions, wherein the weight assigned to a given candidate partition is based on one or more object-detection models that correspond to the given candidate partition, and wherein the weight assigned to the at least one candidate partition is based on (i) a first weight assigned to the first object-detection model and (ii) a second weight assigned to the second object-detection model.

16. The non-transitory computer-readable medium of claim 15, wherein the program instructions that are executable by the at least one processor further comprise program instructions that are executable by the at least one processor to cause the computing system to:
based on deriving the reconciled set of object-detection conclusions for the object of interest from the first and second set of object-detection conclusions, modifying (i) the first weight assigned to the first object-detection model and (ii) the second weight assigned to the second object-detection model.

17. The non-transitory computer-readable medium of claim 10, wherein the program instructions that are executable by the at least one processor to cause the computing system to determine that the image of the scene comprises the object of interest comprise program instructions that are executable by the at least one processor to cause the computing system to:
based on the reconciled set of object-detection conclusions and one or more particular object-detection requirements for the screening system, determine that the image of the scene comprises an object of interest for the screening system.

18. The non-transitory computer-readable medium of claim 10, wherein the program instructions that are executable by the at least one processor further comprise program instructions that are executable by the at least one processor to cause the computing system to:

based on determining that the image of the scene comprises the object of interest, cause at least one of (i) a display screen associated with the screening system to display a visualization related to the reconciled set of object-detection conclusions or (ii) a pass-through operation to occur at the screening system.

19. A computer-implemented method comprising:

receiving an image of a scene that was scanned by a detection device of a screening system, wherein the image comprises an object of interest;

identifying at least a first set of object-detection conclusions for the image generated by a first object-detection model and a second set of object-detection conclusions for the image generated by a second object-detection model, wherein at least one conclusion discrepancy exists between the first and second set of object-detection conclusions;

resolving the at least one conclusion discrepancy by:
  determining a measure of similarity between a first localization conclusion from the first set of object-detection conclusions and a second localization conclusion from the second set of object-detection conclusions, wherein the first and second localization conclusions were both determined to refer to the object of interest;
  defining a plurality of candidate partitions, wherein at least one candidate partition of the plurality of candidate partitions is defined based on the measure of similarity between the first and second localization conclusions; and
  based on a weight assigned to the at least one candidate partition, deriving a reconciled set of object-detection conclusions for the object of interest from the first and second set of object-detection conclusions, thereby resolving the at least one conclusion discrepancy; and based on the reconciled set of object-detection conclusions, determining that the image of the scene comprises the object of interest.

20. The computer-implemented method of claim 19, further comprising:

based on determining that the image of the scene comprises the object of interest, causing at least one of (i) a display screen associated with the screening system to display a visualization related to the reconciled set of object-detection conclusions or (ii) a pass-through operation to occur at the screening system.

* * * * *